(12) United States Patent
Maeda et al.

(10) Patent No.: US 9,894,515 B2
(45) Date of Patent: Feb. 13, 2018

(54) INFORMATION PROCESSING DEVICE, COMPUTER-IMPLEMENTED METHOD OF ESTIMATING A WAITING TIME, AND NON-TRANSITORY COMPUTER-READABLE STORAGE MEDIUM

(71) Applicant: FUJITSU LIMITED, Kawasaki-shi, Kanagawa (JP)

(72) Inventors: Jun Maeda, Chofu (JP); Kazuho Maeda, Kawasaki (JP); Akihiro Inomata, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/384,607

(22) Filed: Dec. 20, 2016

(65) Prior Publication Data

US 2017/0195870 A1 Jul. 6, 2017

(30) Foreign Application Priority Data

Jan. 6, 2016 (JP) ................. 2016-001393

(51) Int. Cl.
*H04W 8/24* (2009.01)
*H04W 4/02* (2009.01)

(52) U.S. Cl.
CPC ............ *H04W 8/24* (2013.01); *H04W 4/027* (2013.01); *H04W 4/028* (2013.01)

(58) Field of Classification Search
CPC ..... H04W 4/027; H04W 4/028; H04W 4/043; H04W 4/00; H04W 4/021; H04W 4/026; H04W 12/06; H04W 52/0251; H04W 52/0254; H04W 52/028; H04W 4/008; H04W 4/02
See application file for complete search history.

(56) References Cited

U.S. PATENT DOCUMENTS

| | | | |
|---|---|---|---|
| 5,572,221 A * | 11/1996 | Marlevi | H04W 28/18 342/452 |
| 5,581,625 A | 12/1996 | Connell | |
| 9,609,577 B1 * | 3/2017 | Ramalingam | H04W 48/04 |
| 9,681,359 B2 * | 6/2017 | Ramalingam | H04W 48/04 |

(Continued)

FOREIGN PATENT DOCUMENTS

| | | |
|---|---|---|
| JP | 7-287763 | 10/1995 |
| JP | 2002-329196 | 11/2002 |

(Continued)

*Primary Examiner* — Diane Mizrahi
(74) *Attorney, Agent, or Firm* — Fujitsu Patent Center

(57) ABSTRACT

An information processing device configured to communicate with a plurality of mobile terminals, the information processing device includes a memory and a processor coupled to the memory and configured to acquire, from the plurality of mobile terminals, information related to movements of the plurality of mobile terminals, identify, based on the information, movement patterns of the plurality of mobile terminals, identify, based on the movement patterns, a queue including at least two mobile terminals of the plurality of mobile terminals, identify, based on the information of the mobile terminals included in the queue, a waiting time that elapses before a first mobile terminal that is one of the plurality of mobile terminals and that is included in the queue reaches a head of the queue, and output the identified waiting time.

18 Claims, 27 Drawing Sheets

| TERMINAL ID | START TIME | WITHDRAWAL TIME | MOVEMENT INFORMATION | | | | | | SAME QUEUE AT TIME OF START | SAME QUEUE AT PRESENT | COMMUNICATION TIME |
|---|---|---|---|---|---|---|---|---|---|---|---|
| | | | CLASSIFICATION | TIME | CLASSIFICATION | TIME | CLASSIFICATION | TIME | | | |
| 10-A | XX:XX | XX:XX | S | XX:XX | M | XX:XX | S | XX:XX | X | | XX:XX |
| | | | M | XX:XX | | | | | | | |
| 10-B | XX:XX | | S | XX:XX | M | XX:XX | S | XX:XX | X | X | XX:XX |
| | | | M | XX:XX | | | | | | | |
| 10-C | XX:XX | | S | XX:XX | M | XX:XX | S | XX:XX | X | X | XX:XX |
| | | | M | XX:XX | | | | | | | |
| 10-D | XX:XX | | S | XX:XX | M | XX:XX | S | XX:XX | | | XX:XX |
| | | | M | XX:XX | | | | | | | |
| SELF-TERMINAL | XX:XX | | S | XX:XX | M | XX:XX | S | XX:XX | | | XX:XX |
| | | | M | XX:XX | | | | | | | |

(56) References Cited

U.S. PATENT DOCUMENTS

2006/0011462 A1 1/2006 Horiguchi et al.
2016/0224845 A1* 8/2016 Gyger ................ G06K 9/00778

FOREIGN PATENT DOCUMENTS

| JP | 2004-38823 | 2/2004 |
| JP | 2004-131389 | 4/2004 |
| JP | 2004-164507 | 6/2004 |
| JP | 2012-75056 | 4/2012 |

* cited by examiner

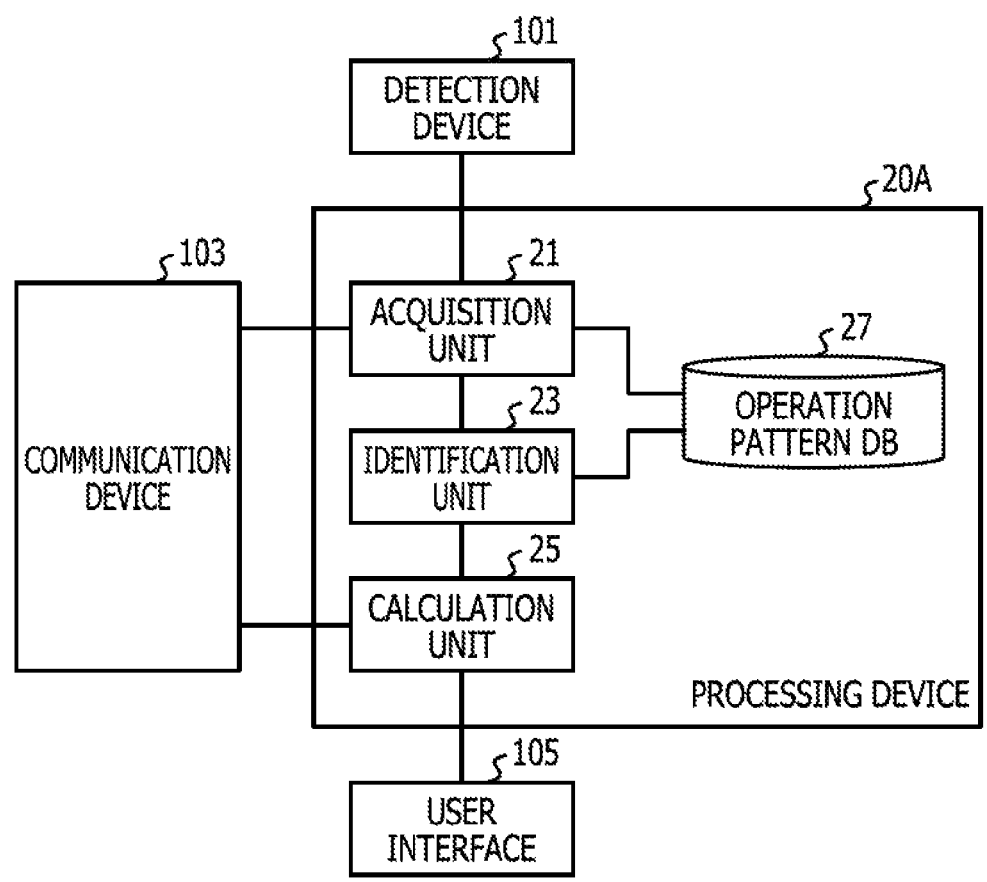

FIG. 4

| TERMINAL ID | START TIME | WITHDRAWAL TIME | MOVEMENT INFORMATION ||||||  SAME QUEUE AT TIME OF START | SAME QUEUE AT PRESENT | COMMUNICATION TIME |
|---|---|---|---|---|---|---|---|---|---|---|---|
| | | | CLASSIFICATION | TIME | CLASSIFICATION | TIME | CLASSIFICATION | TIME | | | |
| 10-A | xx:xx | xx:xx | S | xx:xx | M | xx:xx | S | xx:xx | x | | xx:xx |
| | | | M | xx:xx | | | | | | | |
| 10-B | xx:xx | | S | xx:xx | M | xx:xx | S | xx:xx | x | x | xx:xx |
| | | | M | xx:xx | | | | | | | |
| 10-C | xx:xx | | S | xx:xx | M | xx:xx | S | xx:xx | x | x | xx:xx |
| | | | M | xx:xx | | | | | | | |
| 10-D | xx:xx | | S | xx:xx | M | xx:xx | S | xx:xx | | | xx:xx |
| SELF-TERMINAL | xx:xx | | S | xx:xx | M | xx:xx | S | xx:xx | | | xx:xx |
| | | | M | xx:xx | | | | | | | |

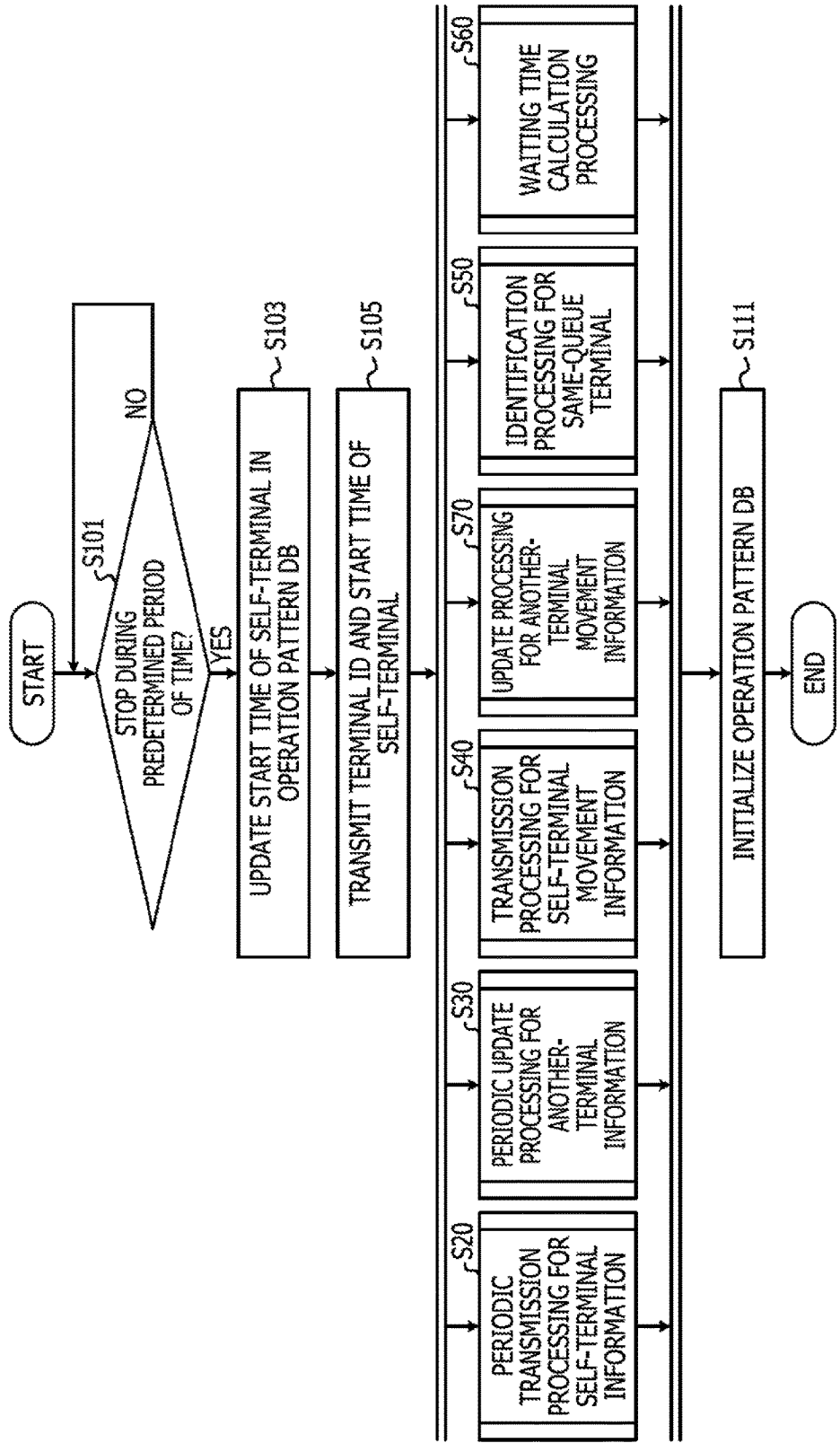

FIG. 12A

| TERMINAL ID | START TIME | WITHDRAWAL TIME | MOVEMENT INFORMATION | | | SAME QUEUE AT TIME OF START | SAME QUEUE AT PRESENT | COMMUNICATION TIME |
| --- | --- | --- | --- | --- | --- | --- | --- | --- |
| | | | CLASSIFICATION | TIME | CLASSIFICATION | TIME | | |
| SELF-TERMINAL | 10:50 | | | | | | | |

FIG. 12B

| TERMINAL ID | START TIME | WITHDRAWAL TIME | MOVEMENT INFORMATION | | | SAME QUEUE AT TIME OF START | SAME QUEUE AT PRESENT | COMMUNICATION TIME |
| --- | --- | --- | --- | --- | --- | --- | --- | --- |
| | | | CLASSIFICATION | TIME | CLASSIFICATION | TIME | | |
| SELF-TERMINAL | 10:50 | | | | | | | |
| 10-A | 10:40 | | | | | | | 10:51 |
| 10-B | 10:10 | | | | | | | 10:51 |
| 10-C | 10:30 | | | | | | | 10:51 |
| 10-U | 10:45 | | | | | | | 10:51 |

FIG. 12C

| TERMINAL ID | START TIME | WITHDRAWAL TIME | MOVEMENT INFORMATION | | | SAME QUEUE AT TIME OF START | SAME QUEUE AT PRESENT | COMMUNICATION TIME |
| --- | --- | --- | --- | --- | --- | --- | --- | --- |
| | | | CLASSIFICATION | TIME | CLASSIFICATION | TIME | | |
| SELF-TERMINAL | 10:50 | | M | 10:53:30 | | | | |

FIG. 12D

| TERMINAL ID | START TIME | WITHDRAWAL TIME | MOVEMENT INFORMATION | | | SAME QUEUE AT TIME OF START | SAME QUEUE AT PRESENT | COMMUNICATION TIME |
| --- | --- | --- | --- | --- | --- | --- | --- | --- |
| | | | CLASSIFICATION | TIME | CLASSIFICATION | TIME | | |
| SELF-TERMINAL | 10:50 | | M | 10:53:30 | S | 10:53:40 | | |

FIG. 13

| TERMINAL ID | START TIME | WITHDRAWAL TIME | MOVEMENT INFORMATION ||||| SAME QUEUE AT TIME OF START | SAME QUEUE AT PRESENT | COMMUNICATION TIME |
| | | | CLASSIFICATION | TIME | CLASSIFICATION | TIME | CLASSIFICATION | TIME | | | |
|---|---|---|---|---|---|---|---|---|---|---|---|
| SELF-TERMINAL | 10:50 | | | | | | | | | | |
| 10-A | 10:40 | | | | | | | | | | 10:51 |
| 10-B | 10:10 | | M | 10:51:00 | S | 10:51:10 | | | | | 10:51 |
| 10-C | 10:30 | | | | | | | | | | 10:51 |
| ⋮ | | | | | | | | | | | |
| 10-U | 10:45 | | | | | | | | | | 10:51 |

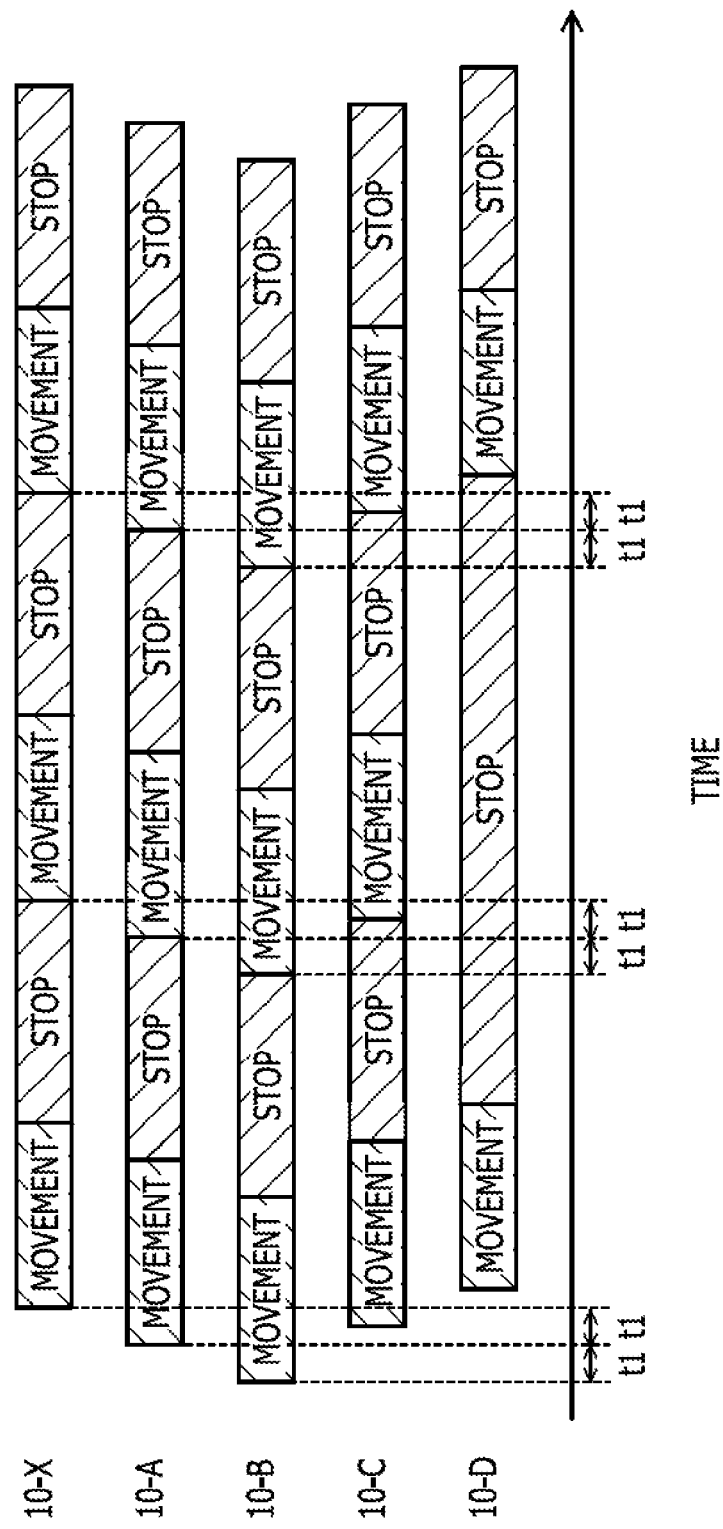

FIG. 15A

| TERMINAL ID | START TIME | WITHDRAWAL TIME | MOVEMENT INFORMATION ||||| SAME QUEUE AT TIME OF START | SAME QUEUE AT PRESENT | COMMUNICATION TIME |
| --- | --- | --- | --- | --- | --- | --- | --- | --- | --- |
| | | | CLASSIFICATION | TIME | CLASSIFICATION | TIME | | | |
| SELF-TERMINAL | 10:50 | | M | 10:51:27 | S | 10:51:30 | ... 10:53:27 | | | 11:10 |
| 10-A | 10:40 | | M | 10:51:21 | S | 10:51:24 | ... 10:53:21 | × | × | 11:10 |
| 10-B | 10:10 | | M | 10:51:03 | S | 10:51:13 | ... 10:53:03 | × | | 11:10 |
| 10-C | 10:05 | 11:05 | M | 10:51:00 | S | 10:51:10 | ... 10:53:00 | × | | 11:04 |
| 10-D | 11:00 | | M | 11:02:03 | S | 11:02:13 | ... 11:04:03 | | × | 11:10 |

FIG. 15B

| TERMINAL ID | START TIME | WITHDRAWAL TIME | MOVEMENT INFORMATION ||||| SAME QUEUE AT TIME OF START | SAME QUEUE AT PRESENT | COMMUNICATION TIME |
| --- | --- | --- | --- | --- | --- | --- | --- | --- | --- |
| | | | CLASSIFICATION | TIME | CLASSIFICATION | TIME | | | |
| SELF-TERMINAL | 10:50 | | M | 10:51:27 | S | 10:51:30 | ... 10:53:27 | | | 11:10 |
| 10-A | 10:40 | | M | 10:51:21 | S | 10:51:24 | ... 10:53:21 | × | × | 11:10 |
| 10-B | 10:10 | | M | 10:51:03 | S | 10:51:13 | ... 10:53:03 | × | × | 11:10 |
| 10-C | 10:05 | 11:05 | M | 10:51:00 | S | 10:51:10 | ... 10:53:00 | × | | 11:04 |
| 10-D | 11:00 | 11:06 | M | 11:02:03 | S | 11:02:13 | ... 11:04:03 | | | 11:05 |

FIG. 18

| TERMINAL ID | START TIME | WITHDRAWAL TIME | MOVEMENT INFORMATION | | | | | QUEUE NUMBER | PROCESSING COMPLETION FLAG | COMMUNICATION TIME |
|---|---|---|---|---|---|---|---|---|---|---|
| | | | CLASSIFICATION | TIME | CLASSIFICATION | TIME | CLASSIFICATION | TIME | | | |
| 10-A | 10:40 | | M | 10:51:21 | S | 10:51:24 | ... | M | 10:53:21 | 1 | | 11:10 |
| 10-B | 10:10 | | M | 10:51:03 | S | 10:51:13 | ... | M | 10:53:03 | 1 | | 11:10 |
| 10-C | 10:05 | 11:05 | M | 10:51:00 | S | 10:51:10 | ... | M | 10:53:00 | 1 | | 11:04 |
| 10-D | 11:00 | | M | 11:02:03 | S | 11:02:13 | ... | M | 11:04:03 | 1 | | 11:10 |

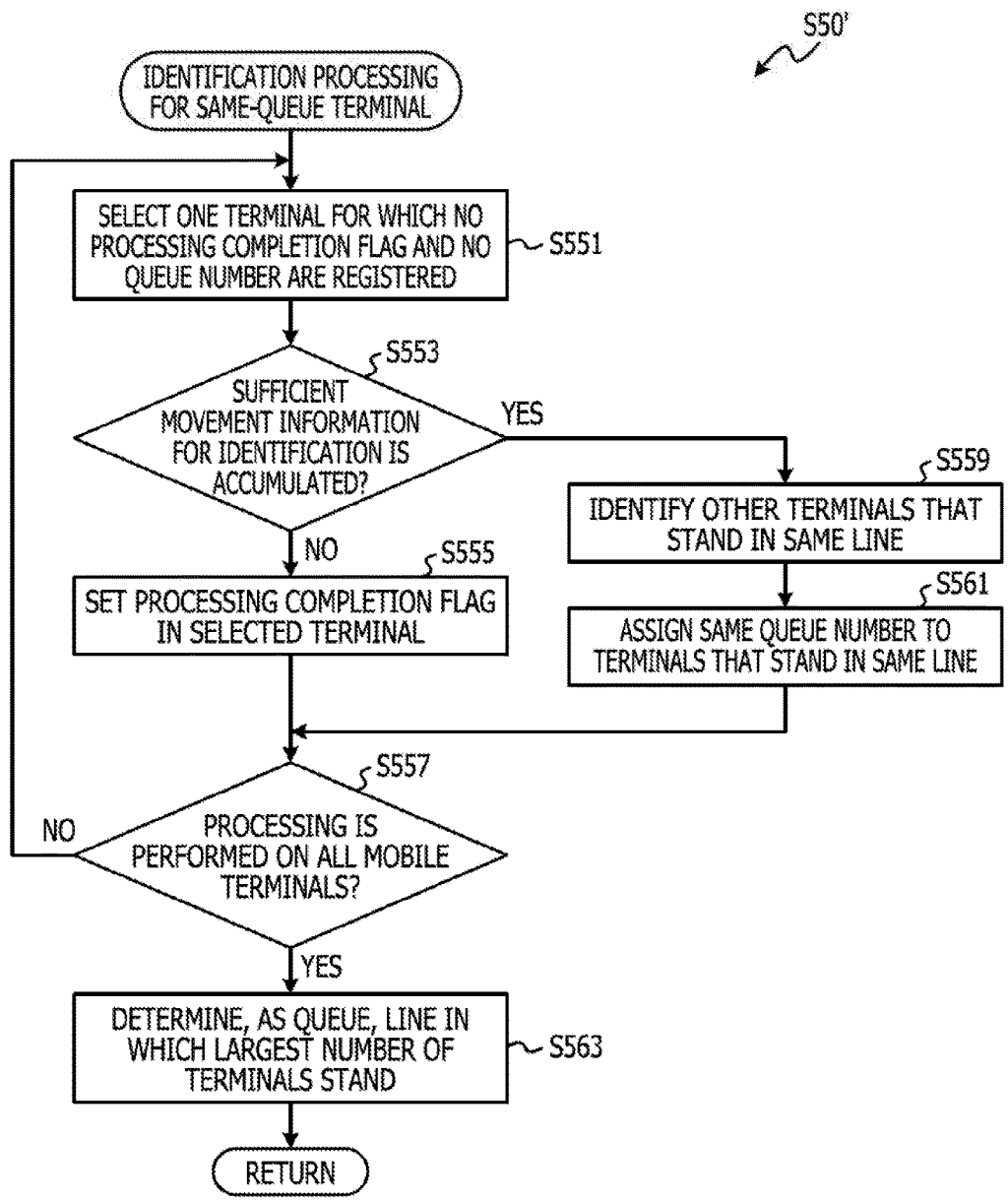

FIG. 24A

| TERMINAL ID | START TIME | WITHDRAWAL TIME | MOVEMENT INFORMATION | | | | | | QUEUE NUMBER | PROCESSING COMPLETION FLAG | COMMUNICATION TIME |
|---|---|---|---|---|---|---|---|---|---|---|---|
| | | | CLASSIFICATION | TIME | CLASSIFICATION | TIME | CLASSIFICATION | TIME | | | |
| 10-A | 10:40 | | M | 10:51:21 | S | 10:51:24 | M | 10:53:21 | 1 | | 11:10 |
| 10-B | 10:10 | | M | 10:51:03 | S | 10:51:13 | M | 10:53:03 | 1 | | 11:10 |
| 10-C | 10:05 | | M | 10:51:00 | S | 10:51:10 | M | 10:53:00 | 1 | | 11:10 |
| 10-D | 11:00 | | M | 11:02:03 | S | 11:02:13 | M | 11:02:13 | 1 | | 11:10 |
| 10-E | 11:05 | | M | 11:05:03 | S | 11:05:07 | M | 11:05:13 | 2 | | 11:10 |
| 10-F | 11:09 | | M | 11:09:03 | S | 11:09:13 | | | | | 11:10 |

FIG. 24B

| TERMINAL ID | START TIME | WITHDRAWAL TIME | MOVEMENT INFORMATION ||||| QUEUE NUMBER | PROCESSING COMPLETION FLAG | COMMUNICATION TIME |
| | | | CLASSIFICATION | TIME | CLASSIFICATION | TIME | CLASSIFICATION | TIME | | | |
|---|---|---|---|---|---|---|---|---|---|---|---|
| 10-A | 10:40 | | M | 10:51:21 | S | 10:51:24 | M | 10:53:21 | 1 | | 11:10 |
| 10-B | 10:10 | | M | 10:51:03 | S | 10:51:13 | M | 10:53:03 | 1 | | 11:10 |
| 10-C | 10:05 | | M | 10:51:00 | S | 10:51:10 | M | 10:53:00 | 1 | | 11:10 |
| 10-D | 11:00 | | M | 11:02:03 | S | 11:02:13 | M | 11:02:13 | 1 | | 11:10 |
| 10-E | 11:05 | | M | 11:05:03 | S | 11:05:07 | M | 11:05:13 | 2 | | 11:10 |
| 10-F | 11:09 | | M | 11:09:03 | S | 11:09:13 | | | | x | 11:10 |

FIG. 25

| TERMINAL ID | START TIME | WITHDRAWAL TIME | MOVEMENT INFORMATION ||||| QUEUE NUMBER | PROCESSING COMPLETION FLAG | COMMUNICATION TIME |
| --- | --- | --- | --- | --- | --- | --- | --- | --- | --- |
| | | | CLASSIFICATION | TIME | CLASSIFICATION | TIME | CLASSIFICATION | TIME | | | |
| 10-A | 10:40 | 11:10 | M | 10:51:21 | S | 10:51:24 | M | 10:53:21 | 1 | | 11:10 |
| 10-B | 10:10 | 10:40 | M | 10:51:03 | S | 10:51:13 | M | 10:53:03 | 1 | | 10:40 |
| 10-C | 10:05 | 10:35 | M | 10:51:00 | S | 10:51:10 | M | 10:53:00 | 1 | | 10:35 |
| 10-D | 11:00 | | M | 11:02:03 | S | 11:02:13 | M | 11:04:03 | 1 | | 11:15 |
| 10-E | 11:05 | 11:13 | M | 11:05:03 | S | 11:05:13 | M | 11:07:03 | 1 | | 11:13 |
| 10-F | 11:10 | | M | 11:11:03 | S | 11:11:13 | M | 11:13:03 | 1 | | 11:15 |

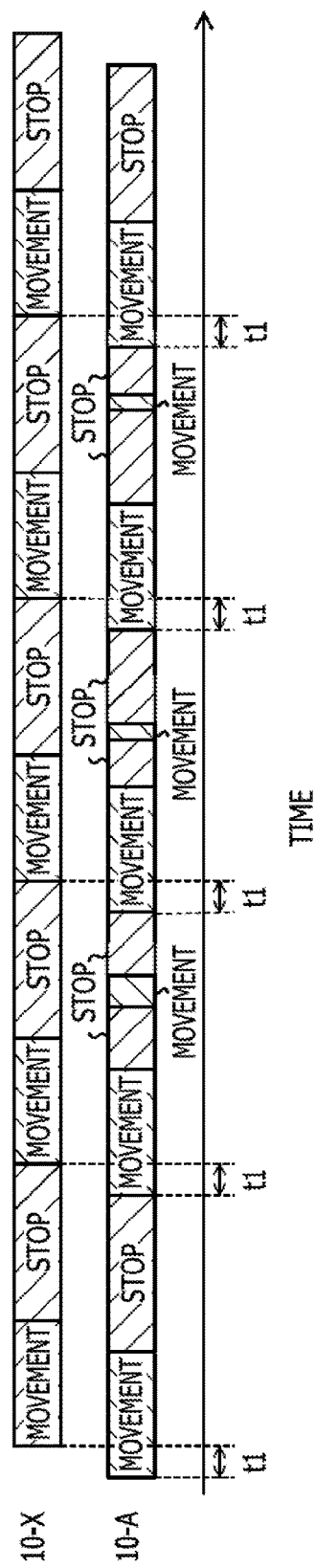

INFORMATION PROCESSING DEVICE, COMPUTER-IMPLEMENTED METHOD OF ESTIMATING A WAITING TIME, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2016-001393, filed on Jan. 6, 2016, the entire contents of which are incorporated herein by reference.

FIELD

The embodiments discussed herein are related to an information processing device, a computer-implemented method of estimating a waiting time, and a non-transitory computer-readable storage medium.

BACKGROUND

In a case where the number of persons who intend to use a facility or a service exceeds the number of persons for which the facility is available or the number of persons to which the service is able to be offered, a waiting queue (hereinafter, called a queue) occurs. As queues, a queue for waiting to pay for fares at a supermarket checkout counter, a queue for waiting for tables at a restaurant, a queue for waiting to enter an art museum, a queue for waiting to go through security checks at an airport, a queue for waiting to use bathrooms, and so forth may be cited, for example. In many case, persons who stand in such queues wish to know how long the persons have to wait until facilities become available or until receiving services.

In the past, in order to inform persons who stand in a queue of waiting times, there has been proposed a method for image-capturing an image including the queue by using a camera, thereby informing of the waiting times, based on the image-captured image. In addition, there is proposed a method in which persons who stand in a queue register, in a server, standing in the queue and in which the persons are informed of a usage state of a facility, based on the number of persons registered in the server. As documents of related arts, there are Japanese Laid-open Patent Publication No. 2004-131389, Japanese Laid-open Patent Publication No. 7-287763, Japanese Laid-open Patent Publication No. 2002-329196, Japanese Laid-open Patent Publication No. 2004-38823, and Japanese Laid-open Patent Publication No. 2004-164507.

SUMMARY

According to an aspect of the invention, an information processing device configured to communicate with a plurality of mobile terminals, the information processing device includes a memory and a processor coupled to the memory and configured to acquire, from the plurality of mobile terminals, information related to movements of the plurality of mobile terminals, identify, based on the information, movement patterns of the plurality of mobile terminals, identify, based on the movement patterns, a queue including at least 2 mobile terminals of the plurality of mobile terminals, identify, based on the information of the mobile terminals included in the queue, a waiting time that elapses before a first mobile terminal that is one of the plurality of mobile terminals and that is included in the queue reaches a head of the queue, and output the identified waiting time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a functional block diagram of the processing device.

FIG. 4 is a diagram illustrating an example of an operation pattern DB.

FIG. 5 is a flowchart illustrating processing performed by the processing device.

FIGS. 12A to 12D are diagrams each illustrating an example of update of an operation pattern DB.

FIG. 13 is a diagram illustrating an example of update of the operation pattern DB.

FIG. 14 is a diagram for explaining a processing operation in step S507 in FIG. 10.

FIGS. 15A and 15B are diagrams for explaining the waiting time calculation processing.

FIG. 18 is a diagram illustrating an example of an operation pattern DB in a second embodiment.

FIG. 23 is a flowchart illustrating details of identification processing for a same-queue terminal.

FIGS. 24A and 24B are diagrams for explaining the identification processing for a same-queue terminal.

FIG. 25 is a diagram for explaining the waiting time calculation processing.

FIG. 26 is a diagram for explaining exclusion of erroneous detection.

DESCRIPTION OF EMBODIMENTS

In any one of the related arts, in a case where no place in which a queue occurs is known in advance, it is difficult to install a camera or to prepare a server or the like that calculates waiting times. Therefore, in a case where a queue occurs in a place in which no queue usually tends to occur, it is difficult for persons who stand in the queue to know waiting times thereof.

<<First Embodiment>>

Hereinafter, a first embodiment of an information processing system will be described in detail, based on FIG. 1 to FIGS. 15A and 15B. An information processing system 500A of the first embodiment is a system for notifying users who stand in a queue of periods of time that elapse before the users reach a head of the queue.

Figure 1:
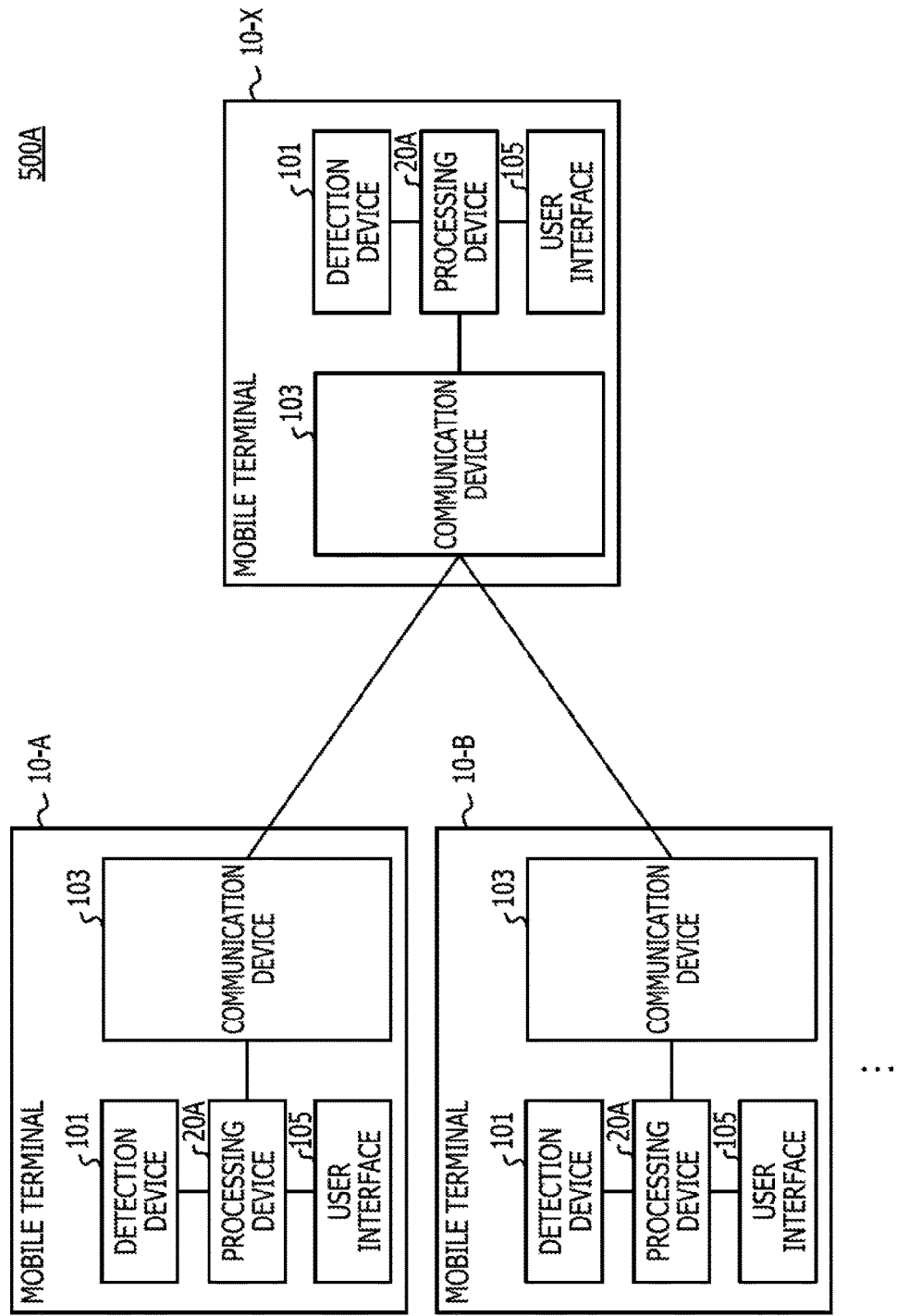
FIG. 1 is a diagram schematically illustrating a configuration of an information processing system according to a first embodiment.

FIG. 1 schematically illustrates a configuration of the information processing system 500A according to the first embodiment. As illustrated in FIG. 1, the information processing system 500A includes mobile terminals 10-A to 10-X. Note that in a case of not having to be specifically distinguished in the following description, the mobile terminals 10-A to 10-X will be described as mobile terminals 10.

Each of the mobile terminals 10 is, for example, a mobile phone, a smartphone, a tablet-type terminal, or the like. The mobile terminals 10 each include a detection device 101, a communication device 103, a user interface 105, and a processing device 20A.

The detection device 101 is, for example, an acceleration sensor and detects a movement and a stop of the corresponding one of the mobile terminals 10 (in other words, a movement and a stop of a user of the relevant mobile terminal 10), thereby outputting the movement and the stop thereof to the processing device 20A.

The communication device 103 directly performs wireless communication with another one of the mobile terminals 10 by using, for example, Bluetooth (registered trademark) or the like. The processing device 20A transmits and receives various pieces of information to and from another one of the mobile terminals 10 via the communication device 103. Note that a communication method of the communication device 103 is not limited to the Bluetooth (registered trademark) and a communication method capable of directly performing wireless communication with another one of the mobile terminals 10, which exists in a range of about 100 m, only has to be adopted.

The user interface 105 is, for example, a display device equipped with a touch panel. The user interface 105 displays an operation screen of the corresponding one of the mobile terminals 10 and receives, from a user, an operation for the relevant mobile terminal 10. In a case where a user of the relevant mobile terminal 10 stands in a queue, the user interface 105 receives, from the user, a request to calculate a period of time (a waiting time) that elapses before the user reaches a head of the relevant queue, for example. In addition, the user interface 105 displays various kinds of information. The user interface 105 displays, for example, the period of time (the waiting time) that elapses before the user reaches a head of the queue.

Figure 2:
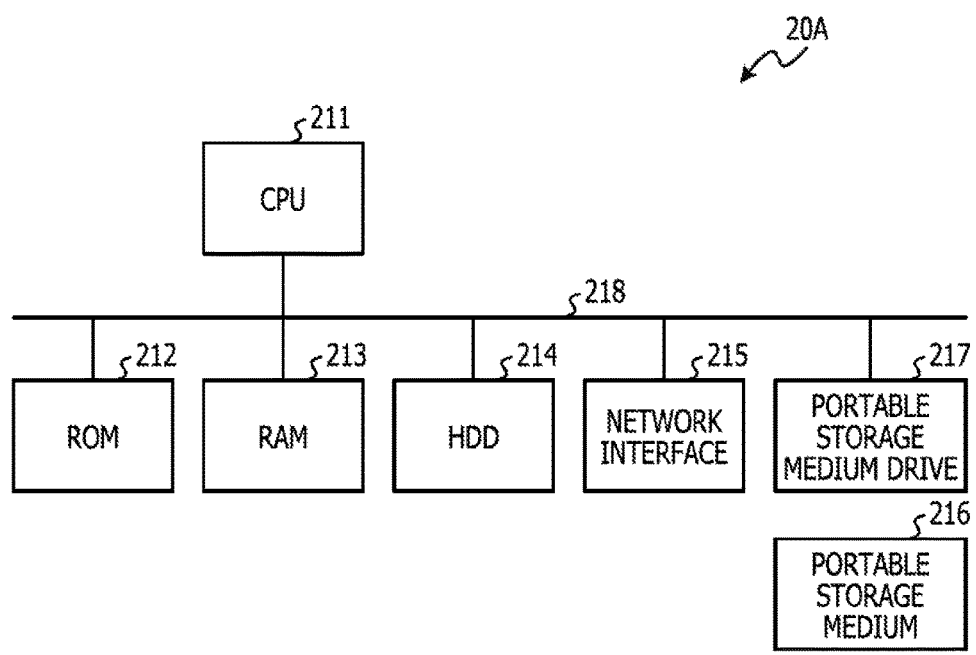
FIG. 2 is a diagram illustrating a hardware configuration of a processing device.

Next, the processing device 20A mounted in each of the mobile terminals 10 will be described. FIG. 2 illustrates a hardware configuration of the processing device 20A. As illustrated in FIG. 2, the processing device 20A includes a central processing unit (CPU) 211, a read only memory (ROM) 212, a random access memory (RAM) 213, a storage device (hard disk drive: HDD) 214, a network interface 215, and a portable storage medium drive 217 capable of reading data stored in a portable storage medium 216. These individual configuration units of the processing device 20A are coupled to a bus 218. The CPU 211 executes programs (including an information processing program) stored in the ROM 212 or the HDD 214 or programs read from the portable storage medium 216 by the portable storage medium drive 217, thereby causing the processing device 20A to function as individual units in FIG. 3.

Specifically, the CPU 211 executes programs, and accordingly, the processing device 20A functions as an acquisition unit 21, an identification unit 23, and a calculation unit 25, as illustrated in FIG. 3.

The acquisition unit 21 acquires information related to a movement and a stop of the corresponding one of the mobile terminals 10 (a movement and a stop of a user of the relevant mobile terminal 10). Specifically, the acquisition unit 21 acquires, from the detection device 101, information (movement information) related to the movement and the stop of the relevant mobile terminal 10 (a self-terminal). In addition, upon determining, based on the movement information, that the user stands in a queue, the acquisition unit 21 transmits (broadcasts), to the other mobile terminals 10 via the communication device 103, a terminal ID for uniquely identifying the self-terminal, and a time at which the user starts standing in the queue, at predetermined intervals (2 to 3 seconds). In addition, in a case where the user starts standing in the queue, the acquisition unit 21 registers, in an operation pattern DB 27, the movement information acquired from the detection device 101. In addition, upon determining, based on a detection result of the detection device 101, that the user moves from a state of a stop and stops again, the acquisition unit 21 transmits (broadcasts) the relevant movement information to the other mobile terminals 10 via the communication device 103.

In addition, the acquisition unit 21 acquires, via the communication device 103, a terminal ID and a time at which a user of another one of the mobile terminals 10 starts standing in the queue, the terminal ID and the time being transmitted (broadcasted) by the other one of the mobile terminals 10 at predetermined intervals (2 to 3 seconds), and the acquisition unit 21 registers the terminal ID and the time in the operation pattern DB 27. In addition, the acquisition unit 21 acquires, via the communication device 103, movement information transmitted (broadcasted) by the other one of the mobile terminals 10, which stands in the queue, and registers the movement information in the operation pattern DB 27.

Here, the operation pattern DB 27 will be described in detail. The operation pattern DB 27 is a database for managing pieces of movement information of the self-terminal and the other mobile terminals 10. The operation pattern DB 27 is stored in the HDD 214 or the like in the processing device 20A. As illustrated in FIG. 4, the operation pattern DB 27 includes fields of "TERMINAL ID", "START TIME", "WITHDRAWAL TIME", "MOVEMENT INFORMATION", "SAME QUEUE AT TIME OF START", "SAME QUEUE AT PRESENT", and "COMMUNICATION TIME".

In the field of "TERMINAL ID", terminal IDs for uniquely identifying the self-terminal and the other mobile terminals 10 are stored. Note that, in the present embodiment, for convenience of explanation, the self-terminal is described as "SELF-TERMINAL" in the field of "TERMI- NAL ID". In the field of "START TIME", times at which users of the mobile terminals 10 identified by terminal IDs start standing in queues are stored. In the field of "WITHDRAWAL TIME", times at which users of the mobile terminals 10 identified by terminal IDs get out of queues (times at which the users stop standing in the queues halfway or times at which the users get out of the queues at heads thereof) are stored.

In the field of "MOVEMENT INFORMATION", movement information of each of the mobile terminals 10 is stored. The field of "MOVEMENT INFORMATION" includes subfields of "CLASSIFICATION" that each indicates a movement or a stop, and subfields of "TIME" that each indicates a start time of a movement or a stop. In the present embodiment, in a case where one of the mobile terminals 10 starts a movement, in other words, a user thereof starts a movement, "M" is stored in the subfield of "CLASSIFICATION", and a time at which the movement is started is stored in the subfield of "TIME". In addition, in a case where one of the mobile terminals 10 stops (stops a movement), "S" is stored in the subfield of "CLASSIFICATION", and a time at which the relevant mobile terminal 10 stops is stored in the subfield of "TIME".

In the field of "SAME QUEUE AT TIME OF START", "X" is stored for each of the mobile terminals 10 included in the same queue as that of the self-terminal in a case where the user of the self-terminal starts standing in the queue. In the field of "SAME QUEUE AT PRESENT", "X" is stored for each of the mobile terminals 10 included in the same queue as that of the self-terminal at present. In the field of "COMMUNICATION TIME", times at which last pieces of information are received from the other mobile terminals 10 are stored. Specific data stored in the operation pattern DB 27 and an example of update will be described later.

Returning to FIG. 3, by using the operation pattern DB 27, the identification unit 23 identifies the mobile terminals 10 included in the same queue as that of the self-terminal, thereby identifying a queue including the self-terminal. Specifically, the identification unit 23 acquires operation patterns of the respective other mobile terminals 10, from the pieces of movement information of the other mobile terminals 10, stored in the operation pattern DB 27, and acquires an operation pattern of the self-terminal from the movement information of the self-terminal. Based on whether the operation patterns of the respective other mobile terminals 10 and the operation pattern of the self-terminal are similar to each other, the identification unit 23 identifies the mobile terminals 10 included in the same queue as that of the self-terminal.

The calculation unit 25 calculates a period of time (a waiting time) that elapses before a user who stands in a queue reaches a head of the queue, and the calculation unit 25 displays the period of time in the user interface 105. Details of a method for calculating the waiting time will be described later.

Next, details of information processing performed by the processing device 20A will be described by arbitrarily referencing flowcharts in FIG. 5 to FIG. 11 and other drawings.

Processing in FIG. 5 is started in a case where a user of the corresponding one of the mobile terminals 10 starts up an application installed in the relevant mobile terminal 10, and the processing in FIG. 5 is repeatedly performed until the relevant user terminates the relevant application. Note that it is assumed that the operation pattern DB 27 is initialized at a time of start-up of the application and no data is registered therein.

In the processing in FIG. 5, first in step S101, based on a detection result of the detection device 101, the acquisition unit 21 repeats determination in step S101 until the corresponding one of the mobile terminals 10 stops (stops moving) during a predetermined period of time (for example, 10 to 30 seconds). In addition, in a stage in which the corresponding one of the mobile terminals 10 stops during the predetermined period of time, the acquisition unit 21 makes a transition to step S103.

Upon making a transition to step S103, the acquisition unit 21 records a time at which the user starts standing in a queue. Specifically, in the operation pattern DB 27, the acquisition unit 21 registers a current time in the field of "START TIME" of the self-terminal. In a case where, at, for example, 10:50, the acquisition unit 21 determines that the corresponding one of the mobile terminals 10 stops during the predetermined period of time, the acquisition unit 21 registers "10:50" in the field of "START TIME" of the self-terminal, as illustrated in FIG. 12A.

In subsequent step S105, the acquisition unit 21 transmits (broadcasts), to the other mobile terminals 10, the terminal ID and a start time (the time at which the user starts standing in the queue) of the self-terminal.

After step S105 finishes, the processing device 20A performs in parallel periodic transmission processing for self-terminal information (S20), periodic update processing for another-terminal information (S30), transmission processing for self-terminal movement information (S40), update processing for another-terminal movement information (S70), identification processing for a same-queue terminal (S50), and waiting time calculation processing (S60).

(Periodic Transmission Processing for Self-Terminal Information: S20)

First, details of the periodic transmission processing for self-terminal information in step S20 in FIG. 5 will be described with reference to FIG. 6. The periodic transmission processing for self-terminal information is processing for notifying the other mobile terminals 10 that a user of the corresponding one of the mobile terminals 10 stands in a queue.

Figure 6:
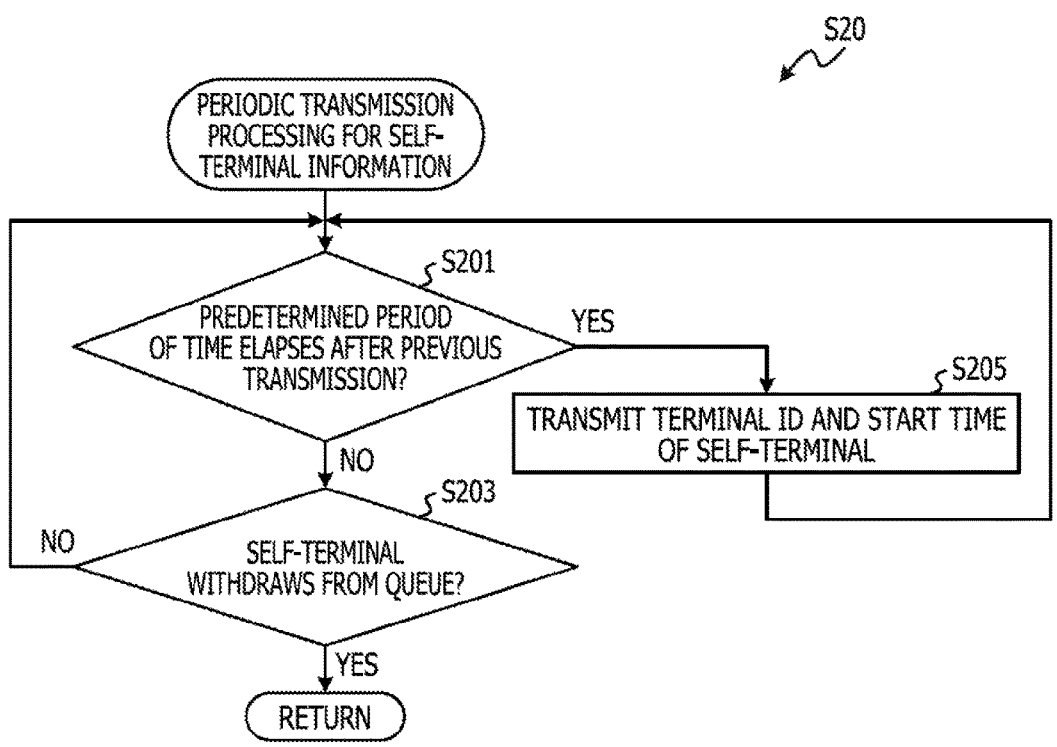
FIG. 6 is a flowchart illustrating details of periodic transmission processing for self-terminal information.

In processing in FIG. 6, first in step S201, the acquisition unit 21 determines whether or not a predetermined period of time (for example, 2 to 3 seconds) elapses after the terminal ID and the start time of the self-terminal are transmitted last time. In a case where the determination here is affirmed, the processing makes a transition to step S205, and the acquisition unit 21 transmits (broadcasts), to the other mobile terminals 10, the terminal ID and the start time of the corresponding one of the mobile terminals 10. After the processing operation in step S205, the processing returns to step S201.

On the other hand, in a case where the determination in step S201 is denied, the acquisition unit 21 makes a transition to step S203, and determines whether or not the self-terminal withdraws from the queue, in other words, the user stops standing in the queue or the user gets out of the queue. In, for example, a case of recognizing, based on a detection result of the detection device 101, that the corresponding one of the mobile terminals 10 continues moving during a period of time greater than or equal to a predetermined period of time (for example, 30 seconds), the acquisition unit 21 determines that the corresponding one of the mobile terminals 10 withdraws from the queue. In a case of recognizing, based on the movement information registered in the operation pattern DB 27, that an operation pattern of the corresponding one of the mobile terminals 10 changes, in other words, in a case of recognizing that a change occur in a regularity that exists between movements and stops repeated by the relevant mobile terminal 10, the acquisition unit 21 may determine that the relevant mobile terminal 10 withdraws from the queue.

In a case where the relevant mobile terminal 10 does not withdraw from the queue, the processing returns to step S201. However, in a case where the relevant mobile terminal 10 withdraws from the queue, the processing makes a transition to step S111 in FIG. 5.

Based on the above-mentioned periodic transmission processing for self-terminal information, it is possible to inform the mobile terminals 10 of respective persons who stand in the queue that the user of the self-terminal stands in the queue. In addition, by transmitting information (the terminal ID and the start time) of the self-terminal at predetermined intervals, it is possible to inform the other mobile terminals 10 that the user of the self-terminal continues standing in the queue. Furthermore, after a user stands in the queue, it is possible to provide, with the information of the self-terminal, the mobile terminal 10 of the user who stands in the queue.

(Periodic Update Processing for Another-Terminal Information: S30)

Next, details of the periodic update processing for another-terminal information in step S30 in FIG. 5 will be described with reference to FIG. 7. The periodic update processing for another-terminal information is processing for updating the operation pattern DB 27 by using information of a terminal ID and a start time, transmitted by the above-mentioned periodic transmission processing for self-terminal information (FIG. 6) performed by another one of the mobile terminals 10.

Figure 7:
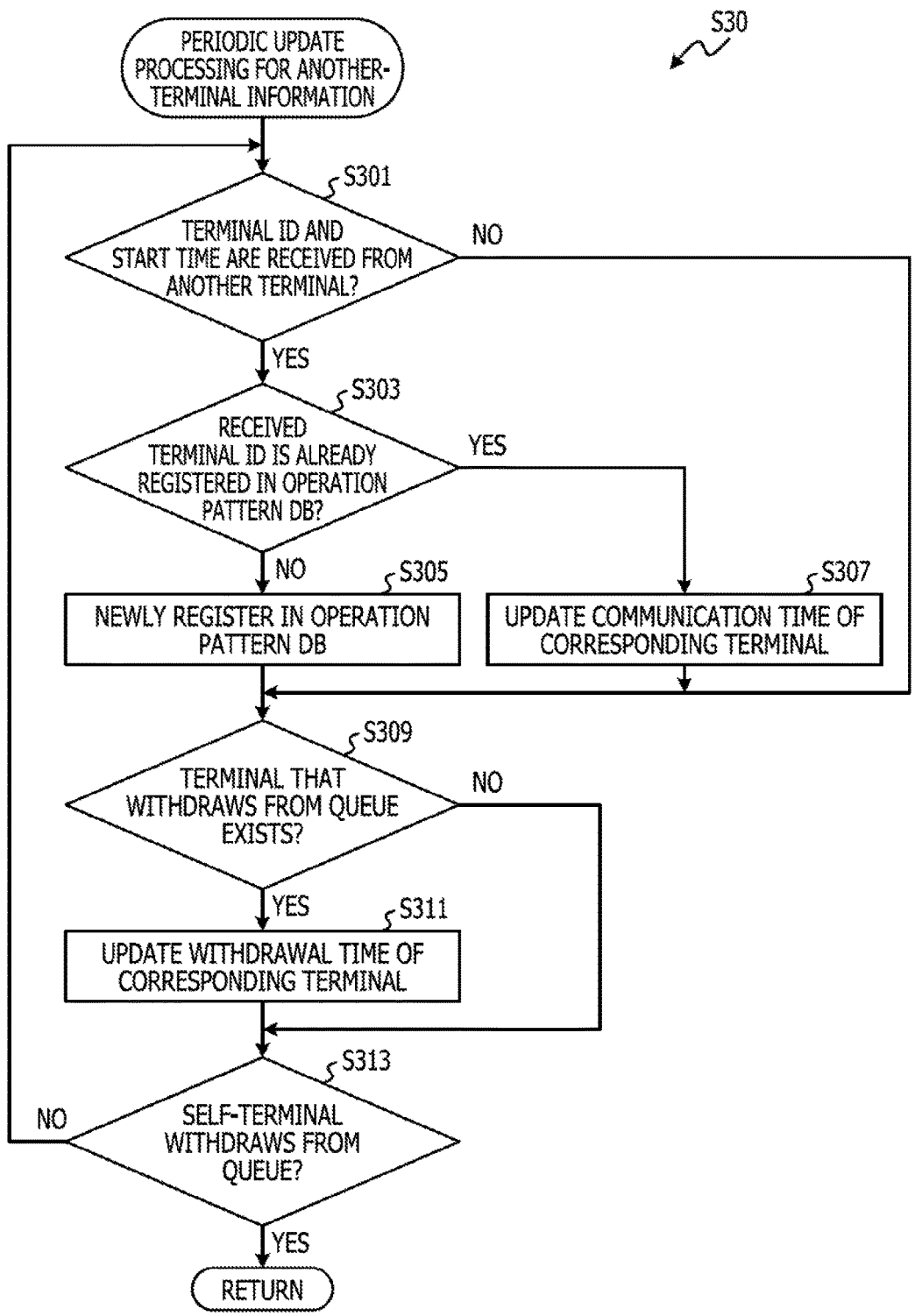
FIG. 7 is a flowchart illustrating details of periodic update processing for another-terminal information.

In processing in FIG. 7, first in step S301, the acquisition unit 21 determines whether or not a terminal ID and a start time are received from another one of the mobile terminals 10. In a case where the determination here is denied, the processing makes a transition to step S309. However, in a case where the determination here is affirmed, the processing makes a transition to step S303.

Upon making a transition to step S303, the acquisition unit 21 determines whether or not the received terminal ID is already registered in the operation pattern DB 27. In a case where the determination here is denied, the processing makes a transition to step S305, and the received terminal ID is newly registered in the operation pattern DB 27. As illustrated in, for example, FIG. 12B, the acquisition unit 21 newly registers, in the operation pattern DB 27, "TERMINAL ID" and "START TIME" of the other one of the mobile terminals 10. In addition, the acquisition unit 21 registers a current time in the field of "COMMUNICATION TIME". On the other hand, in a case where the received terminal ID is already registered in the operation pattern DB 27, the acquisition unit 21 makes a transition to step S307 and updates the field of "COMMUNICATION TIME" of the relevant terminal ID with the current time.

In subsequent step S309, the acquisition unit 21 determines whether or not one of the mobile terminals 10, which withdraws from the queue, exists. Specifically, by using the operation pattern DB 27, the acquisition unit 21 determines whether or not one of the mobile terminals 10, which performs no communication during a predetermined period of time (for example, 30 seconds), exists. More specifically, the acquisition unit 21 determines whether or not one of the mobile terminals 10, for which a difference between "COMMUNICATION TIME" and the current time is greater than or equal to a predetermined period of time (for example, 30 seconds), exists. As described above, each of the mobile terminals 10 included in the queue broadcasts a terminal ID and a start time at predetermined intervals (2 to 3 seconds), and in a case of receiving the relevant terminal ID and start time, the acquisition unit 21 updates the field of "COMMUNICATION TIME". Therefore, it may be estimated that one of the mobile terminals 10, for which "COMMUNICATION TIME" is not updated in a period of time greater than or equal to the predetermined period of time, withdraws from the queue.

Therefore, in a case where the determination in step S309 is affirmed, in step S311 the acquisition unit 21 registers the current time in the field of "WITHDRAWAL TIME" of the corresponding terminal.

On the other hand, in a case where the determination in step S309 is denied, in step S313 the acquisition unit 21 determines, in the same way as in step S203 in FIG. 6, whether or not the self-terminal withdraws from the queue. In a case where the determination here is denied, the processing returns to step S301. However, in a case where the determination here is affirmed, the processing makes a transition to step S111 in FIG. 5.

Based on the above-mentioned periodic update processing for another-terminal information, it is possible to register, in the operation pattern DB 27, information of the other mobile terminals 10 included in the queue, and it is possible to identify one of the mobile terminals 10, which withdraws from the queue.

(Transmission Processing for Self-Terminal Movement Information: S40)

Next, details of the transmission processing for self-terminal movement information in step S40 in FIG. 5 will be described with reference to FIG. 8. The transmission processing for self-terminal movement information is processing for transmitting, to the other mobile terminals 10, movement information related to a case where a user who stands in a queue moves from a state of a stop and stops again.

Figure 8:
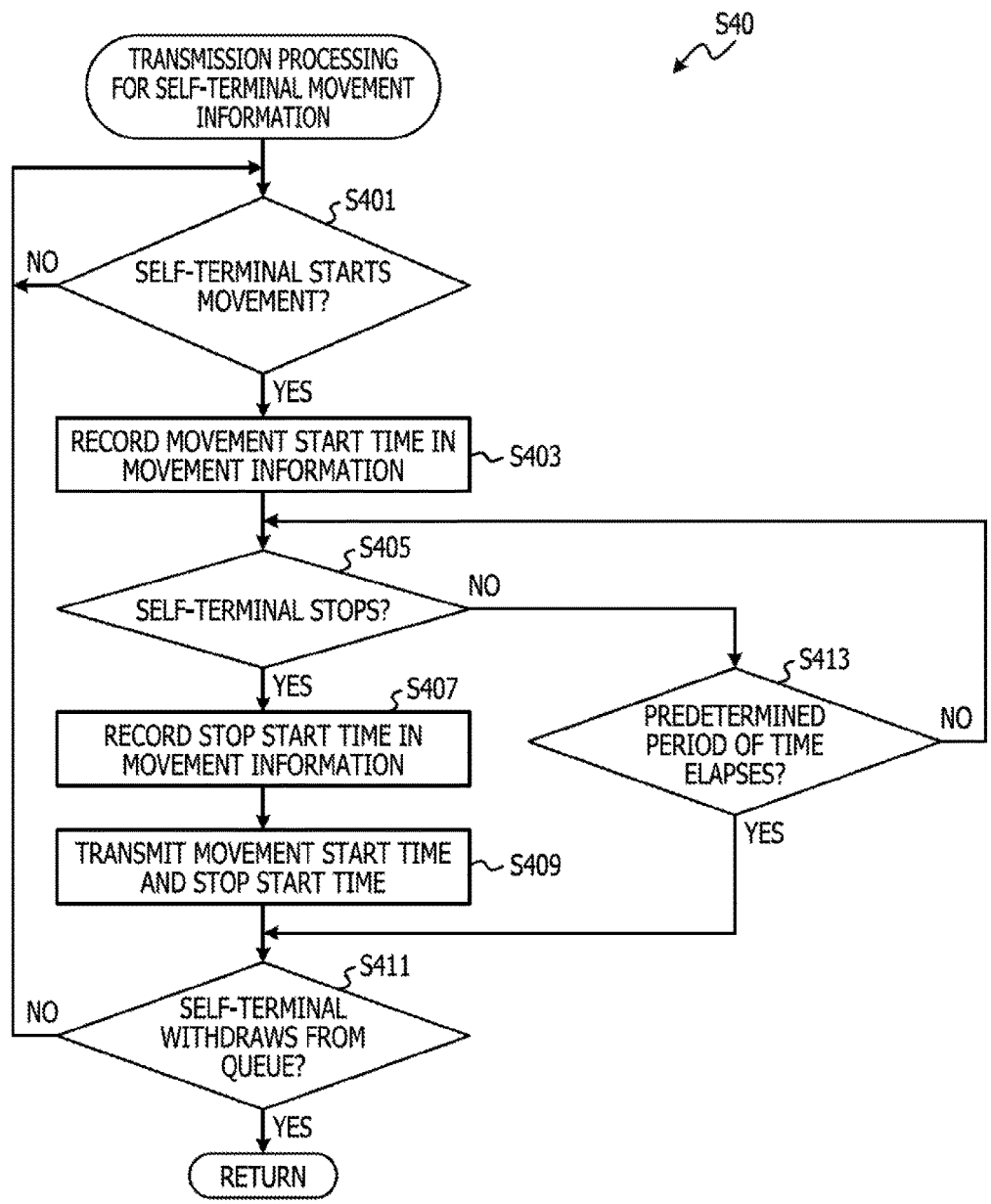
FIG. 8 is a flowchart illustrating details of transmission processing for self-terminal movement information.

In processing in FIG. 8, in step S401, the acquisition unit 21 waits until the self-terminal starts a movement. In addition, upon recognizing, based on a detection result of the detection device 101, that the self-terminal starts a movement, the acquisition unit 21 makes a transition to step S403 and registers, in the field of "MOVEMENT INFORMATION" in the operation pattern DB 27, a time at which the self-terminal starts a movement. Specifically, as illustrated in FIG. 12C, in the field of "MOVEMENT INFORMATION", the acquisition unit 21 registers, in "CLASSIFICATION", "M" indicating a movement and registers, in "TIME", a current time.

In subsequent step S405, based on a detection result of the detection device 101, the acquisition unit 21 determines whether or not the self-terminal stops. In a case where the determination here is denied, the processing makes a transition to step S413.

Upon making a transition to step S413, the acquisition unit 21 determines whether or not a predetermined period of time (for example, 20 seconds) elapses after the self-terminal starts a movement. In the present step S413, it is determined whether the movement of the self-terminal detected in step S401 is a movement associated with a movement of the queue (a movement caused by advancement of the queue) or another movement. In case of a movement associated with the movement of the queue, a movement time thereof is relatively short (for example, about 3 to 10 seconds). Therefore, in a case of a movement within the predetermined period of time, it may be determined that the relevant movement is a movement associated with the movement of the queue. In a case where the determination in step S413 is affirmed, the processing makes a transition to step S411, and in a case where the determination in step S413 is denied, the processing returns to step S405.

In a case where the self-terminal stops before the predetermined period of time elapses (step S413: NO), the determination in step S405 is affirmed, and the processing makes a transition to step S407.

Upon making a transition to step S407, the acquisition unit 21 registers a time at which the self-terminal starts a stop, in the field of "MOVEMENT INFORMATION" in the operation pattern DB 27. Specifically, as illustrated in FIG. 12D, in the field of "MOVEMENT INFORMATION", the acquisition unit 21 registers, in "CLASSIFICATION", "S" indicating a stop and registers the current time in "TIME".

In subsequent step S409, the acquisition unit 21 transmits (broadcasts), to the other mobile terminals 10, the movement information (a movement start time and a stop start time) of the self-terminal. From this, the movement information of the self-terminal stored in the operation pattern DB 27 of each of the other mobile terminals 10 is updated.

In subsequent step S411, in the same way as in step S203 in FIG. 6, the acquisition unit 21 determines whether or not the self-terminal withdraws from the queue. In a case where the determination here is denied, the processing returns to step S401. However, in a case where the determination here is affirmed, the processing makes a transition to step S111 FIG. 5.

Based on the above-mentioned transmission processing for self-terminal movement information, it is possible to provide the other mobile terminals 10 with the movement information of the self-terminal. Based on the provided movement information, the other mobile terminals 10 each update the operation pattern DB 27.

(Update Processing for Another-Terminal Movement Information: S70)

Next, by using FIG. 9, details of the update processing for another-terminal movement information in step S70 in FIG. 5 will be described. The update processing for another-terminal movement information is processing for updating the operation pattern DB 27, based on movement information transmitted by the transmission processing for self-terminal movement information (FIG. 8) performed by another one of the mobile terminals 10 included in a queue.

Figure 9:
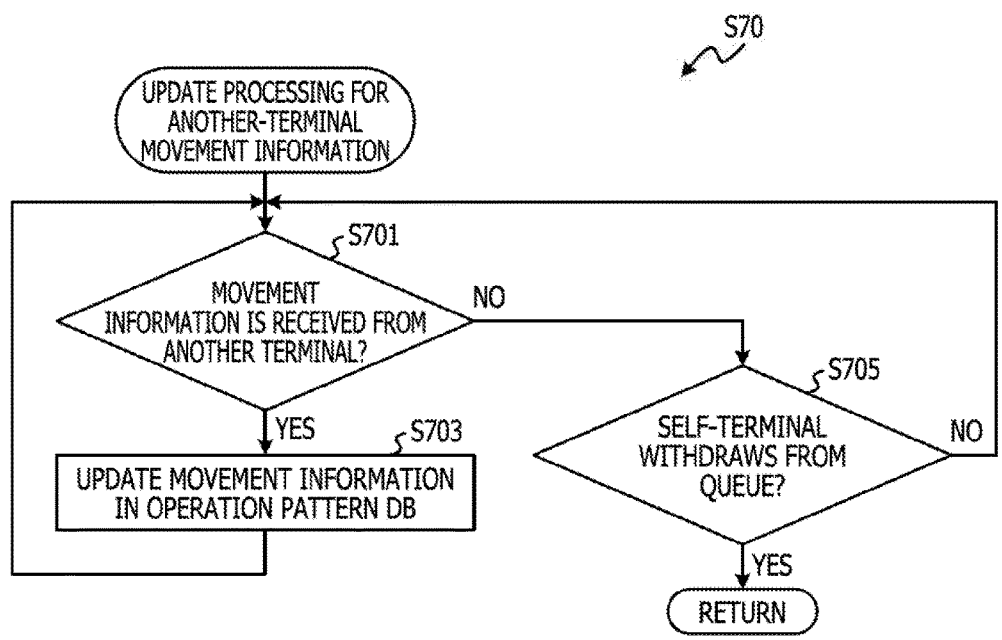
FIG. 9 is a flowchart illustrating details of update processing for another-terminal movement information.

In processing in FIG. 9, first in step S701, the acquisition unit 21 determines whether or not movement information is received from another one of the mobile terminals 10. In a case where the other one of the mobile terminals 10 performs the above-mentioned transmission processing for self-terminal movement information (FIG. 8), determination in step S701 is affirmed. In a case where the determination in step S701 is affirmed, the processing makes a transition to step S703.

Upon making a transition to step S703, the acquisition unit 21 updates the movement information of the other one of the mobile terminals 10 in the operation pattern DB 27. As illustrated in, for example, FIG. 13, the field of the "MOVEMENT INFORMATION" of the other one of the mobile terminals 10 (a terminal ID: 10-B) is updated. After the processing operation in step S703, the processing returns to step S701.

On the other hand, in a case where the determination in step S701 is denied, the processing makes a transition to step S705, and in the same way as in step S203 in FIG. 6, the acquisition unit 21 determines whether or not the self-terminal withdraws from the queue. In a case where the determination here is denied, the processing returns to step S701. However, in a case where the determination here is affirmed, the processing makes a transition to step S111 in FIG. 5.

Based on the above-mentioned update processing for another-terminal movement information, the movement information of the other one of the mobile terminals 10 included in the queue is accumulated in the operation pattern DB 27.

(Identification Processing for Same-Queue Terminal: S50)

Next, by using FIG. 10, details of the identification processing for a same-queue terminal in step S50 in FIG. 5 will be described. The identification processing for a same-queue terminal is processing for identifying a queue including the self-terminal, by identifying the other mobile terminals 10 included in the same queue as that of the self-terminal.

Figure 10:
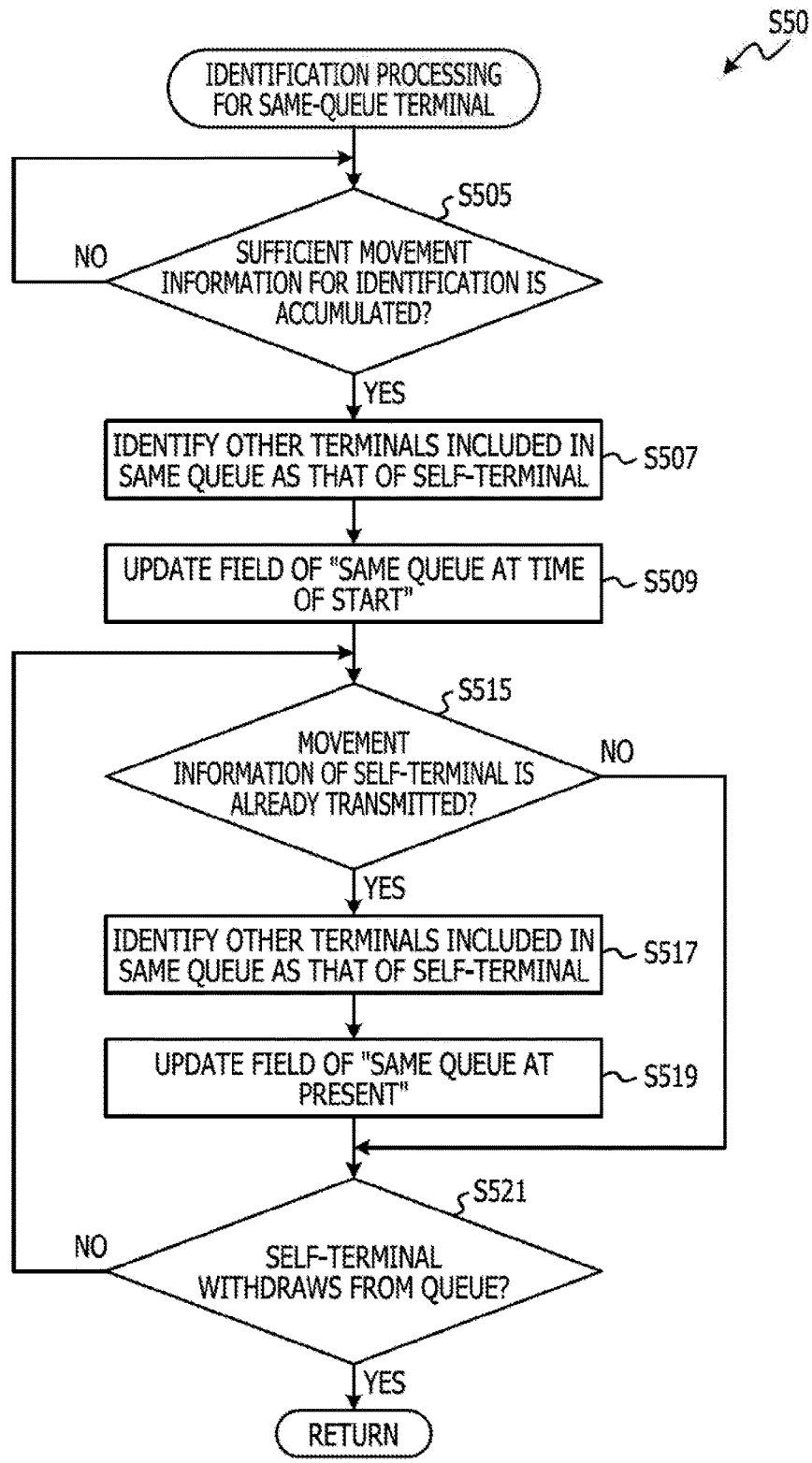
FIG. 10 is a flowchart illustrating details of identification processing for a same-queue terminal.

In processing in FIG. 10, first in step S505, the identification unit 23 waits until sufficient movement information to identify the other mobile terminals 10 included in the same queue as that of the self-terminal is accumulated in the operation pattern DB 27. As described above, based on whether or not the operation pattern of the self-terminal and the operation patterns of the other mobile terminals 10 are similar to each other, the identification unit 23 identifies the other mobile terminals 10 included in the same queue as that of the self-terminal. Accordingly, in the operation pattern DB 27, the movement information has to be accumulated to an extent that it is possible to confirm a similarity. Here, in a case where the number of cycles of a movement → a stop registered in, for example, the field of "MOVEMENT INFORMATION" of the self-terminal is greater than or equal to a predetermined number (for example, greater than or equal to 2 cycles), the identification unit 23 determines that the sufficient movement information to identify is accumulated.

In a case where the determination in step S505 is affirmed, the identification unit 23 makes a transition to step S507.

Upon making a transition to step S507, based on whether or not the operation pattern of the self-terminal and the operation patterns of the other mobile terminals 10 are similar to each other, the identification unit 23 identifies the other mobile terminals 10 included in the same queue as that of the self-terminal.

Here, a specific processing operation in step S507 will be described. Here, it is assumed that the processing device 20A mounted in the mobile terminal 10-X performs the identification processing for a same-queue terminal. In this case, as illustrated in FIG. 14, the identification unit 23 acquires operation patterns of the respective mobile terminals 10 from the movement information registered in the operation pattern DB 27.

Next, the identification unit 23 identifies some of the mobile terminals 10 in each of which cycles of a movement → a stop are similar to those of the mobile terminal 10-X and in which there is a regular anteroposterior relationship between the movement of the mobile terminal 10-X and the movements of the other mobile terminals 10. Here, in FIG. 14, cycles of a movement → a stop of each of the mobile terminal 10-A and the mobile terminal 10-B are similar to cycles of a movement → a stop of the mobile terminal 10-X. Furthermore, the mobile terminal 10-A starts a movement t1 seconds after the mobile terminal 10-B starts a movement, and the mobile terminal 10-X starts a movement t1 seconds after the mobile terminal 10-A starts a movement. Therefore, it may be thought that there is a regular anteroposterior relationship between the movement of the mobile terminal 10-X and the movements of the mobile terminals 10-A and 10-B.

On the other hand, while cycles of a movement → a stop of the mobile terminal 10-C are similar to those of the mobile terminal 10-X, timings at which movements are started are different from those of each of the mobile terminals 10-A, 10-B, and 10-X. In addition, cycles of a movement → a stop of the mobile terminal 10-D are different from those of the mobile terminal 10-X. In this case, the identification unit 23 determines that the operation patterns of the mobile terminal 10-A, the mobile terminal 10-B, and the mobile terminal 10-X are similar to one another, and the identification unit 23 identifies that the mobile terminal 10-A and the mobile terminal 10-B are the mobile terminals 10 included in the same queue as that of the mobile terminal 10-X. From this, it may be identified that the queue including the mobile terminal 10-X is a queue including the mobile terminals 10-A and 10-B.

Note that the identification unit 23 may identify the order of the mobile terminals 10 that stand in the queue, based on timings at which each of the mobile terminals 10 starts movements. From this, it is possible to understand an anteroposterior relationship between the mobile terminals 10 that stand in the queue. In a case of FIG. 14, the mobile terminals 10 stand in the queue in the order of the mobile terminals 10-B, 10-A, and 10-X.

Returning to FIG. 10, in subsequent step S509, in the operation pattern DB 27, the identification unit 23 registers "X" in the field of "SAME QUEUE AT TIME OF START" of each of the mobile terminals 10 identified in step S507.

Processing operations in and after subsequent step S515 are processing operations for identifying the mobile terminals 10 included in the same queue as that of the self-terminal at present. In step S515, the identification unit 23 determines whether or not the acquisition unit 21 already transmits the movement information of the self-terminal. In other words, the identification unit 23 determines whether or not the acquisition unit 21 already performs the processing operation in step S409 in FIG. 8. The reason is that, in order to identify the mobile terminals 10 included in the same queue as that of the self-terminal at present, the current operation pattern of the self-terminal has to be acquired.

In a case where the determination in step S515 is denied, the processing makes a transition to step S521. However, in a case where the determination in step S515 is affirmed, the processing makes a transition to step S517.

Upon making a transition to step S517, based on whether or not a most recent operation pattern (for example, most recent 2 cycles of a movement → a stop) of the self-terminal and most recent operation patterns of the mobile terminals 10 are similar to each other, the identification unit 23 identifies the mobile terminals 10 included in the same queue as that of the self-terminal at present, by using the same method as that in step S507.

In subsequent step S519, in the operation pattern DB 27, the identification unit 23 registers "X" in the field of "SAME QUEUE AT PRESENT" of each of the mobile terminals 10 identified in step S507.

In subsequent step S521, in the same way as in step S203 in FIG. 6 or the like, the identification unit 23 determines whether or not the self-terminal withdraws from the queue. In a case where the determination here is denied, the processing returns to step S515. However, in a case where the determination here is affirmed, the processing makes a transition to step S111 in FIG. 5.

Based on the above-mentioned identification processing for a same-queue terminal, it is possible to identify the other mobile terminals 10 included in the same queue as that of the self-terminal, and it is possible to identify a queue including the self-terminal.

(Waiting Time Calculation Processing: S60)

Next, details of the waiting time calculation processing in step S60 in FIG. 5 will be described with reference to FIG. 11. The waiting time calculation processing is processing for calculating a period of time (a waiting time) that elapses before a user of the self-terminal that stands in a queue reaches a head of the relevant queue.

Figure 11:
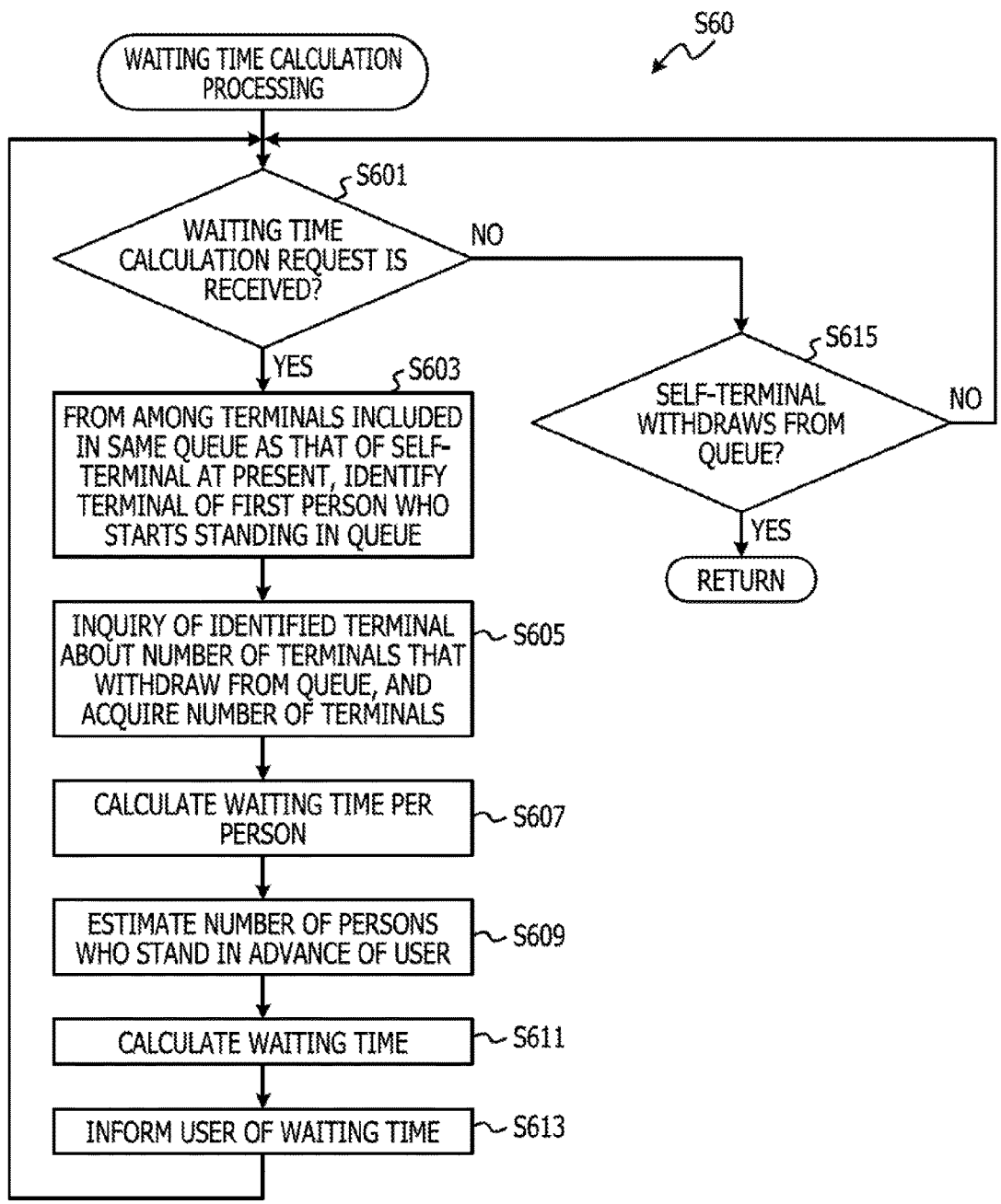
FIG. 11 is a flowchart illustrating details of waiting time calculation processing.

In processing in FIG. 11, first in step S601, the calculation unit 25 determines whether or not a waiting time calculation request that requests to calculate the waiting time is received from a user via the user interface 105. In a case where the determination here is affirmed, the processing makes a transition to step S603.

Upon making a transition to step S603, from among the mobile terminals 10 included in the same queue as that of the self-terminal at present, the calculation unit 25 identifies the mobile terminal 10 of a first person who starts standing in the queue. Specifically, the calculation unit 25 identifies one of the mobile terminals 10, for which "X" is registered in the field of "SAME QUEUE AT PRESENT" of the operation pattern DB 27 and for which a time stored in the field of "START TIME" is the earliest. In a case where the operation pattern DB 27 illustrated in, for example, FIG. 15A is registered, the calculation unit 25 identifies one of the mobile terminals 10, the terminal ID of which is "10-B".

In subsequent step S605, the calculation unit 25 inquires of the mobile terminal 10 identified in step S603 about the number of the mobile terminals 10 that withdraw from the queue between a time at which a user of the mobile terminal 10 identified in step S603 starts standing in the queue and a current time. In the operation pattern DB 27, the mobile terminal 10 that receives the inquiry counts the number of the mobile terminals 10 for each of which "START TIME" is earlier than "START TIME" of the self-terminal, for each of which data is stored in the field of "WITHDRAWAL TIME", and that are included in the mobile terminals 10 for each of which "X" is registered in the field of "SAME QUEUE AT TIME OF START". Then, the mobile terminal 10 that receives the inquiry makes a reply. In a case where the operation pattern DB 27 illustrated in, for example, FIG. 15B is registered, the mobile terminal 10 that receives the inquiry makes a reply while defining, as "1", the number of the mobile terminals 10 that withdraw from the queue.

In subsequent step S607, the calculation unit 25 calculates a waiting time per person. Specifically, first the calculation unit 25 calculates a time obtained by subtracting, from the current time, "START TIME" of the mobile terminal 10 of the first person who starts standing in the queue. Next, by dividing the relevant time by the number of the mobile terminals 10 that withdraw from the queue, the number of the mobile terminals 10 being acquired in step S605, the waiting time per person is calculated.

In subsequent step S609, the calculation unit 25 estimates the number of persons who stand in advance of the user of the self-terminal.

Here, a method for estimating the number of persons who stand in advance of the user will be described. In some cases, a person who has none of the mobile terminals 10 exists within persons who stand in the queue. In a case where persons who have none of the mobile terminals 10 exist in the queue in an unbiased way (evenly), even if the number of the mobile terminals 10 that stand in advance of the self-terminal is defined as the number of persons who stand in advance of the user, thereby calculating the waiting time, a result may be obtained with a reasonable degree of accuracy. However, in a case where persons who have none of the mobile terminals 10 exist in a biased way, for example, in a case where persons who have none of the mobile terminals 10 only exist in advance of the user, the accuracy of the calculated waiting time is reduced.

Therefore, in the present embodiment, first the calculation unit 25 obtains an average value (defined as a first average value) of times between movements of the mobile terminal 10 immediately in front of the self-terminal and times at which the self-terminal starts movements. In addition, regarding each of pairs of the mobile terminals 10 that are adjacent to each other in an alignment order of data of the operation pattern DB 27, the calculation unit 25 obtains a time between a movement of one of the two mobile terminals 10 and a time at which the other of the two mobile terminals 10 starts a movement, and the calculation unit 25 obtains a value (defined as a second average value) obtained by averaging the relevant times. In addition, in a case where the first average value is larger than the second average value, the calculation unit 25 obtains an integer portion of a value calculated by dividing the first average value by the second average value and defines the integer portion as the number of persons who have none of the mobile terminals 10 and who stand in advance of the self-terminal. The calculation unit 25 may round the value calculated by dividing the first average value by the second average value and may define a value obtained by the rounding, as the number of persons who have none of the mobile terminals 10 and who stand in advance of the self-terminal. The calculation unit 25 adds the number of persons who have none of the mobile terminals 10 and who stand in advance of the self-terminal, to the number of the mobile terminals 10 that stand in advance of the self-terminal, thereby calculating the number of persons who stand in advance of the user.

In subsequent step S611, the calculation unit 25 multiplies the waiting time per person, calculated in step S607, by the number of persons who stand in advance of the user, estimated in step S609, thereby calculating a time (a waiting time) it takes for the user of the self-terminal to reach a head of the queue.

In subsequent step S613, the calculation unit 25 informs the user of the waiting time calculated in step S611. The calculation unit 25 displays the waiting time in, for example, the user interface 105. The calculation unit 25 may inform of the waiting time by using sound from a speaker not illustrated. After the processing operation in step S613 finishes, the processing returns to step S601. From this, it is possible for the user to know one's waiting time.

By the way, in a case where the determination in step S601 is denied, in step S615 the calculation unit 25 determines, in the same way as in step S203 in FIG. 6 or the like, whether or not the self-terminal withdraws from the queue. In a case where the determination here is denied, the processing returns to step S601. However, in a case where the determination here is affirmed, the processing makes a transition to step S111 in FIG. 5.

Upon making a transition to step S111 in FIG. 5, the acquisition unit 21 initializes the operation pattern DB 27 and terminates the processing in FIG. 5.

As precisely described above, according to the present first embodiment, the information processing system 500A includes the mobile terminals 10 and the processing devices 20A that are each able to directly communicate with the other mobile terminals 10, and the processing devices 20A are mounted in the respective mobile terminals 10. In addition, the processing devices 20A each include the acquisition unit 21, the identification unit 23, and the calculation unit 25, the acquisition unit 21 being configured to acquire, from each of the mobile terminals 10 (the self-terminal and the other mobile terminals 10), information related to a movement and a stop of the relevant mobile terminal 10, the identification unit 23 being configured to identify a queue including the self-terminal, based on whether or not an operation pattern acquirable from information related to a movement and a stop of the self-terminal and operation patterns acquirable from information related to movements and stops of the other mobile terminals 10 are similar, the calculation unit 25 being configured to calculate, from information related to movements and stops of the mobile terminals 10 included in the queue, a period of time that elapses before the self-terminal reaches a head of the queue. From this, without installing a camera, a server, or the like, it is possible to identify a queue in which a user stands and to notify the user of a period of time that elapses before the user reaches a head of the relevant queue. In addition, in the information processing system 500A, an instrument such as a camera does not have to be installed. Therefore, even in a case where the user stands in a queue that occurs in a place (for example, a park or the like) in which no queue usually tends to occur, it is possible to notify the user of a waiting time.

In addition, since, in the information processing system 500A, a camera does not have to be installed or a device for analyzing images does not have to be used, it is possible to reduce an introduction cost. In addition, since the user does not have to register information in a server, the convenience of the user is enhanced.

In order to estimate the waiting time, usually a waiting queue model or the like has to be prepared, and in a case where the relevant model is unknown, it is difficult to estimate the waiting time. However, in the information processing system 500A, based on the operation pattern of the self-terminal and the operation patterns of the other mobile terminals 10, a period of time that elapses before the self-terminal included in the queue reaches a head of the queue is calculated. Therefore, the model does not have to be prepared. Furthermore, based on whether or not the operation pattern of the self-terminal and the operation patterns of the other mobile terminals 10 are similar, the identification unit 23 identifies the queue including the self-terminal. Therefore, even in a case of a zigzag queue or a meandering queue, it is possible to identify the queue including the self-terminal.

In addition, in the present first embodiment, based on an average value (the first average value) of times between movements of the mobile terminal 10 that is located immediately in front of the self-terminal and that are included in the mobile terminals 10 included in the queue and times at which the self-terminal starts movements, and an average value (the second average value) of times each of which is calculated, regarding each of pairs of the mobile terminals 10 that are adjacent to each other in an alignment order and that are included in the queue, and each of which is a time between a movement of one of the two mobile terminals 10 and a time at which the other of the two mobile terminals 10 starts a movement, the calculation unit 25 calculates the number of persons who have none of the mobile terminals 10 and who stand in advance of the self-terminal. From this, even in a case where persons having none of the mobile terminals 10 stand in the queue, it is possible to calculate the waiting time in consideration of the number of persons who have none of the mobile terminals 10 and who stand in advance of the self-terminal. Therefore, it is possible to obtain a calculation result of the waiting time with a higher degree of accuracy.

In addition, in the present first embodiment, based on an anteroposterior relationship between movement times of the mobile terminals 10 included in the queue, the identification unit 23 identifies the order of the individual mobile terminals 10. Therefore, it is possible to understand an anteroposterior relationship between the mobile terminals 10 included in the queue.

Note that while, in the above-mentioned first embodiment, a case where the processing devices 20A are mounted in the respective mobile terminals 10 is described, the above-mentioned first embodiment is not limited to this. The processing device 20A only has to be mounted in at least 1 of the mobile terminals 10. In this case, in a processing device mounted in each of the other mobile terminals 10, some of the functions of the processing device 20A may be omitted. Specifically, a processing device mounted in each of the other mobile terminals 10 only has to perform processing operations other than the waiting time calculation processing (S60) in FIG. 5, for example.

Note that, in step S609 in FIG. 11 in the above-mentioned first embodiment, from among the mobile terminals 10 included in the same queue as that of the self-terminal at present, the calculation unit 25 may count the number of the mobile terminals 10 of persons who start standing in the queue before the user of the self-terminal, for example. Specifically, the number of the mobile terminals 10 for each of which "X" is registered in the field of "SAME QUEUE AT PRESENT" of the operation pattern DB 27 and for each of which "START TIME" is earlier than "START TIME" of the self-terminal may be defined as the number of persons who stand in advance of the user. In this case, compared with the above-mentioned processing, it is possible to easily estimate persons who stand in advance of the user. Therefore, it is possible to reduce a time it takes to calculate the waiting time.

Note that, in the above-mentioned first embodiment, in a case of a long queue, a time difference in movement between the self-terminal and a terminal that stands a great distance away therefrom widely varies and it becomes difficult to understand a regular anteroposterior relationship in some cases. In addition, if the queue becomes long, constraints on communication distances make it difficult to communicate with all the mobile terminals 10 included in the queue, depending on a communication method, in some case. In such a case, the corresponding one of the mobile terminals 10 may identify a queue existing within a predetermined range from the self-terminal and may acquire, from the mobile terminal 10 located at a head of the relevant queue, information of the operation pattern DB 27 included in the relevant mobile terminal 10, thereby integrating the information with the operation pattern DB 27 of the self-terminal. From this, it is possible to acquire information of all the mobile terminals 10 included in the queue.

Figure 16:
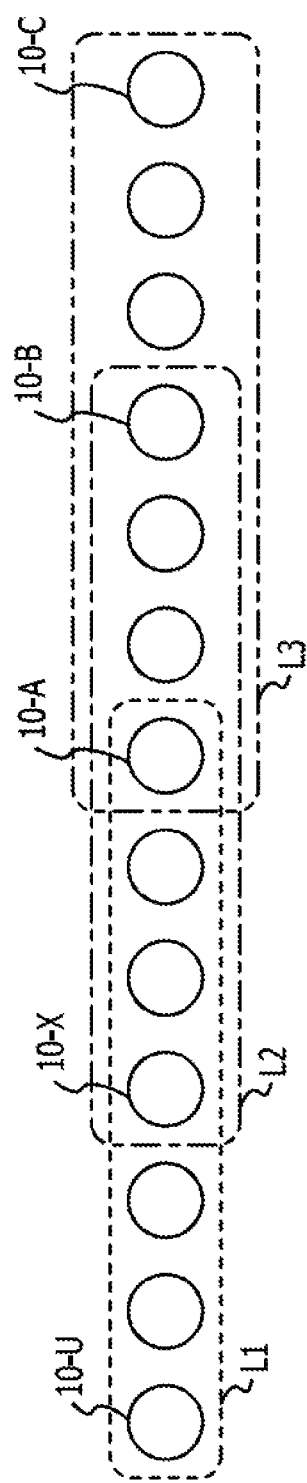
FIG. 16 is a diagram for explaining processing in a case of a long queue.

In addition, in a case of a longer queue, the mobile terminals 10 included in the queue provide each other with information of the operation pattern DB 27, and accordingly, it is possible to acquire information of all the mobile terminals 10 included in the queue. As illustrated in, for example, FIG. 16, a queue in which the mobile terminal 10-C stands at a head thereof and the mobile terminal 10-U stands at an end thereof is assumed. In this case, in the operation pattern DB 27 of the mobile terminal 10-B, pieces of movement information of the mobile terminals 10 included in a queue L3 including the mobile terminal 10-B are stored. In this case, the mobile terminal 10-A acquires the operation pattern DB 27 (storing therein the pieces of movement information of the mobile terminals 10 included in the queue L3) included in the mobile terminal 10-B, from the mobile terminal 10-B that stands at a head of a queue L2 including the mobile terminal 10-A, and the mobile terminal 10-A integrates the operation pattern DB 27 included in the mobile terminal 10-B with the operation pattern DB 27 of the self-terminal. From this, pieces of movement information of the mobile terminal 10-C to the mobile terminal 10-X turn out to be stored in the operation pattern DB 27 of the mobile terminal 10-A. In addition, the mobile terminal 10-X acquires the operation pattern DB 27 included in the mobile terminal 10-A, from the mobile terminal 10-A that stands at a head of a queue L1 including the mobile terminal 10-X, and the mobile terminal 10-X integrates the operation pattern DB 27 included in the mobile terminal 10-A with the operation pattern DB 27 of the self-terminal. From this, pieces of movement information of the mobile terminal 10-C to the mobile terminal 10-U turn out to be stored in the operation pattern DB 27 of the mobile terminal 10-X. Note that the mobile terminal 10B may acquire the operation pattern DB 27 from the mobile terminal 10-A that stands at an end of the queue L3, thereby acquiring pieces of movement information of the mobile terminals 10 included in the queue L2.

<<Second Embodiment>>

Next, a second embodiment of the information processing system will be described in detail, based on FIG. 17 to FIG. 25. An information processing system 500B of the second embodiment is a system for notifying an administrator (for example, a staff who arranges or monitor a queue, or the like) who does not stand in the queue of a waiting time of the queue.

Figure 17:
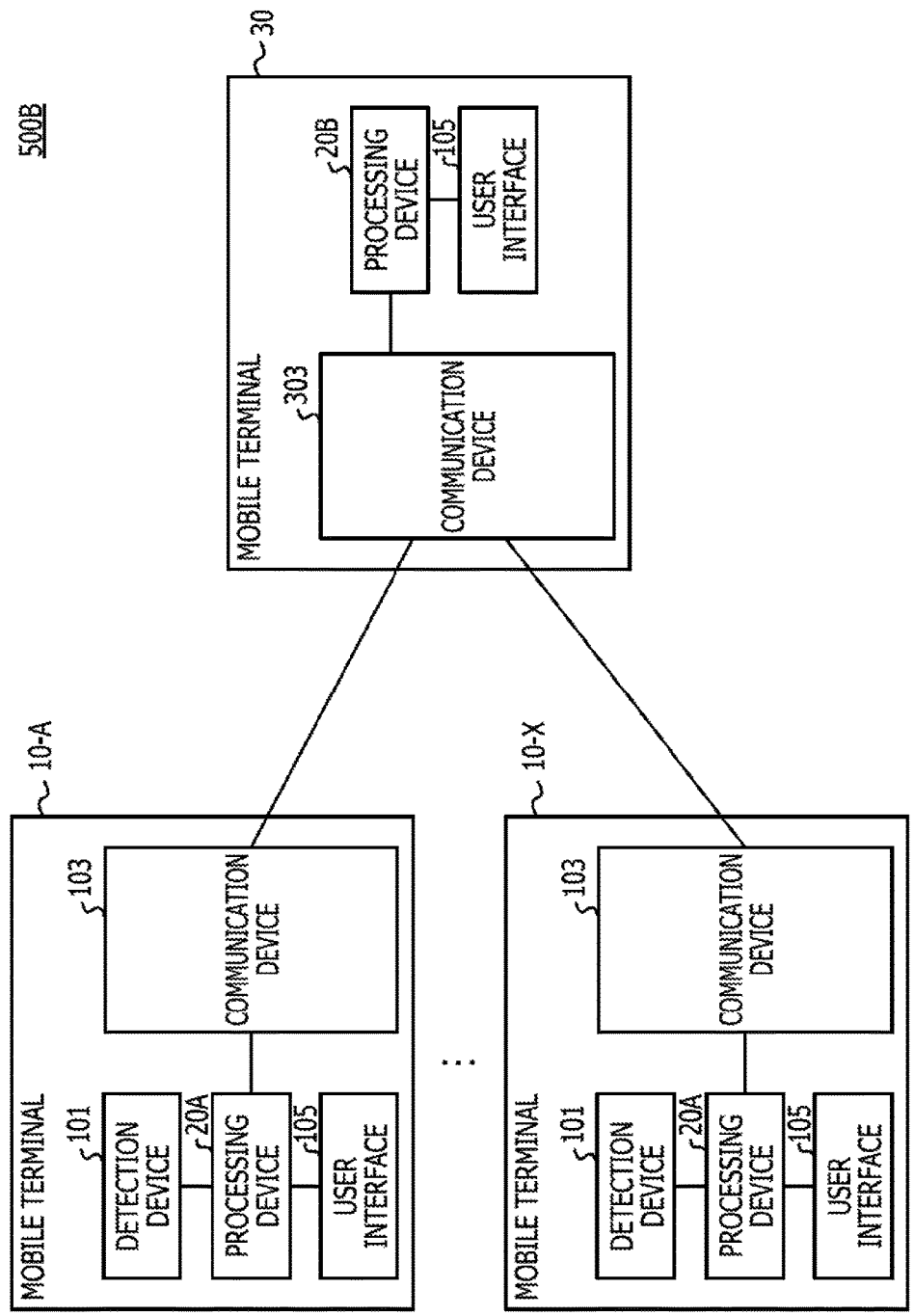
FIG. 17 is a diagram illustrating an outline of an information processing system according to a second embodiment.

FIG. 17 schematically illustrates a configuration of the information processing system 500B according to the second embodiment. As illustrated in FIG. 17, the information processing system 500B includes mobile terminals 10-A to 10-X and an electronic device 30. Note that as long as not having to be specifically distinguished in the following description, the mobile terminals 10-A to 10-X will be described as mobile terminals 10.

Since configurations of the mobile terminals 10 are the same as those in the first embodiment, descriptions thereof will be omitted. Note that while the processing device 20A in each of the mobile terminals 10 may perform all the processing operations illustrated in FIG. 5, the processing device 20A in each of the mobile terminals 10 only has to perform at least steps S101 to S106, S20, and S40 in FIG. 5. In this case, the operation pattern DB 27 of the processing device 20A mounted in each of the mobile terminals 10 only has to include at least the fields of "TERMINAL ID" and "START TIME".

The electronic device 30 is, for example, a smartphone, a tablet-type terminal, a dedicated terminal, or the like. The electronic device 30 includes a communication device 303, a user interface 305, and a processing device 20B.

The communication device 303 directly performs wireless communication with the mobile terminals 10 by using, for example, Bluetooth (registered trademark) or the like. The processing device 20B transmits and receives various pieces of information to and from the mobile terminals 10 via the communication device 303. Note that a communication method of the communication device 303 is not limited to the Bluetooth (registered trademark) and a communication method capable of directly performing wireless communication with the mobile terminals 10 that exist in a range of about 100 m only has to be adopted.

The user interface 305 is, for example, a display device equipped with a touch panel. The user interface 305 displays an operation screen of the electronic device 30 and receives, from a user, an operation for the electronic device 30. Specifically, in a case where a queue exists around the electronic device 30, the user interface 305 receives, from a user, a request to calculate a period of time (a waiting time) that elapses before the terminal 10 that stands at an end of the relevant queue reaches a head thereof. In addition, the user interface 305 displays various kinds of information. The user interface 305 displays, for example, the period of time (the waiting time) that elapses before the terminal 10 that stands at the end of the queue reaches the head thereof.

Since a hardware configuration of the processing device 20B is the same as that of each of the processing devices 20A (see FIG. 2), the description thereof will be omitted. The processing device 20B has nearly the same configuration as that of each of the processing devices 20A (see FIG. 3) except that the configuration of the operation pattern DB 27 is different.

As illustrated in FIG. 18, the operation pattern DB 27 of the processing device 20B is different from the operation pattern DB 27 of each of the processing devices 20A (see, for example, FIG. 4) in that fields of "QUEUE NUMBER" and "PROCESSING COMPLETION FLAG" are included in place of the fields of "SAME QUEUE AT TIME OF START" and "SAME QUEUE AT PRESENT". In addition, in the operation pattern DB 27 of the processing device 20B, no information of the self-terminal is registered.

In the field of "QUEUE NUMBER", numbers for uniquely identifying queues to which the individual mobile terminals 10 belong (which include the individual mobile terminals 10) are stored. In addition, in the field of "PROCESSING COMPLETION FLAG", a flag indicating whether or not processing for identifying the mobile terminals 10 included in the same queue is performed in identification processing for a same-queue terminal (FIG. 23), described below, is stored.

Figure 19:
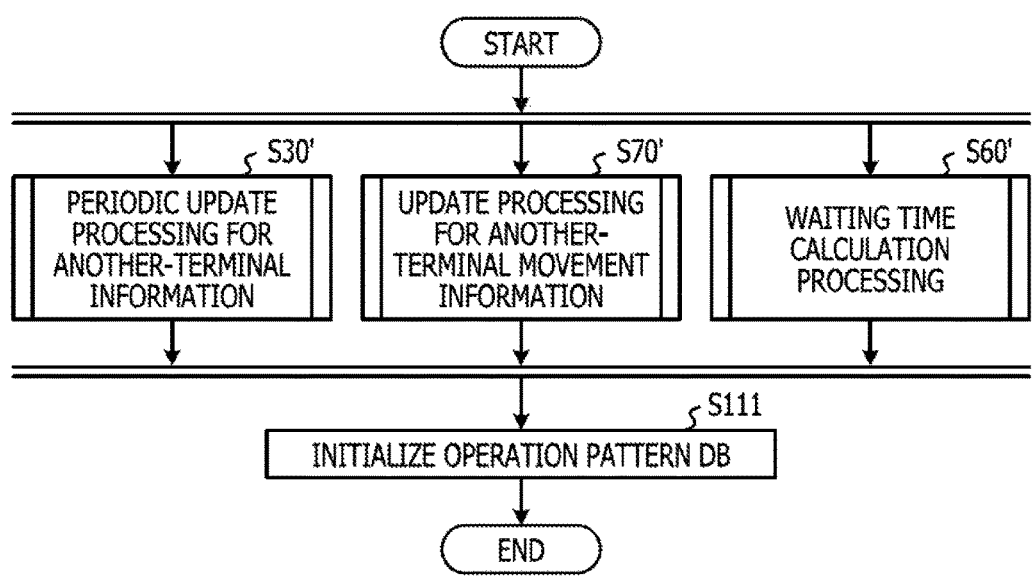
FIG. 19 is a flowchart illustrating an example of processing performed by a processing device in the second embodiment.

Next, information processing performed by the processing device 20B will be described. FIG. 19 is a flowchart illustrating the information processing performed by the processing device 20B. The processing in FIG. 19 is started in a case where a user of the electronic device 30 starts up an application installed in the electronic device 30. As is clear from a comparison between FIG. 19 and FIG. 5, the processing device 20B performs no processing operations in step S101 to S105 in FIG. 5. In addition, the processing device 20B does not perform the periodic transmission processing for self-terminal information (S20) or the transmission processing for self-terminal movement information (S40). In addition, the processing device 20B performs identification processing for a same-queue terminal (S50') within waiting time calculation processing (S60') (see FIG. 22).

(Periodic Update Processing for Another-Terminal Information: S30')

Figure 20:
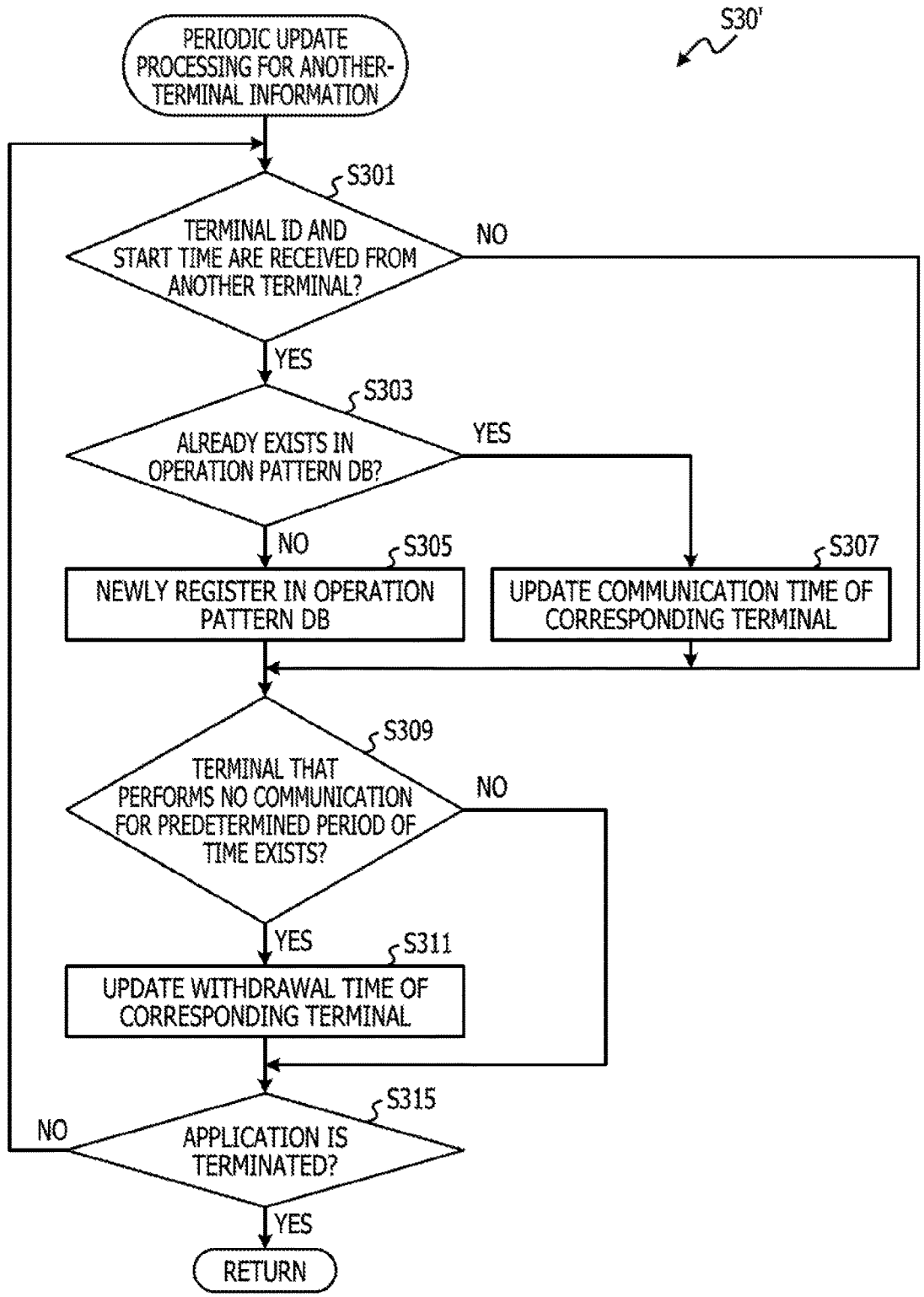
FIG. 20 is a flowchart illustrating details of periodic update processing for another-terminal information.

FIG. 20 is a flowchart illustrating details of periodic update processing for another-terminal information in step S30' in FIG. 19. In FIG. 20, since processing operations in step S301 to step S311 are the same as the processing operations in step S301 to step S311 in FIG. 7, the descriptions thereof will be omitted.

In step S315, the acquisition unit 21 in the processing device 20B determines whether or not the application is terminated by the user. In a case where the determination here is denied, the processing returns to step S301. However, in a case where the determination here is affirmed, the processing makes a transition to step S111 in FIG. 19.

(Update Processing for Another-Terminal Movement Information: S70')

Figure 21:
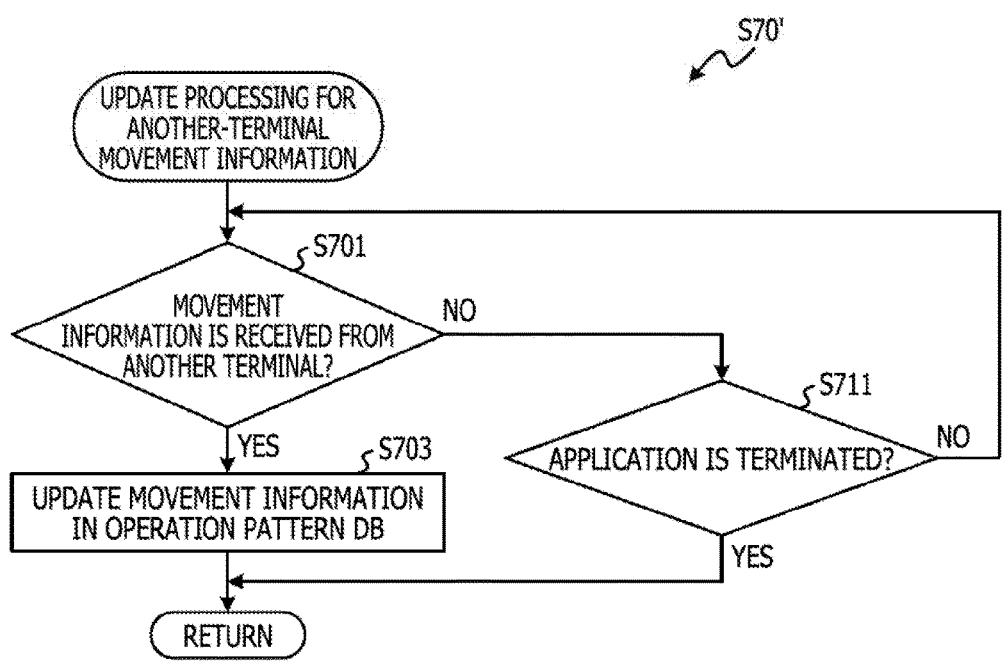
FIG. 21 is a flowchart illustrating details of update processing for another-terminal movement information.

FIG. 21 is a flowchart illustrating update processing for another-terminal movement information in step S70' in FIG. 19. In FIG. 21, since processing operations in steps S701 and S703 are the same as the processing operations in steps S701 and S703 in FIG. 9, the descriptions thereof will be omitted.

In step S711, the acquisition unit 21 in the processing device 20B determines whether or not the application is terminated by the user. In a case where the determination here is denied, the processing returns to step S701. However, in a case where the determination here is affirmed, the processing makes a transition to step S111 in FIG. 19.

(Waiting Time Calculation Processing: S60')

Next, details of the waiting time calculation processing in step S60' in FIG. 19 will be described with reference to FIG. 22.

Figure 22:
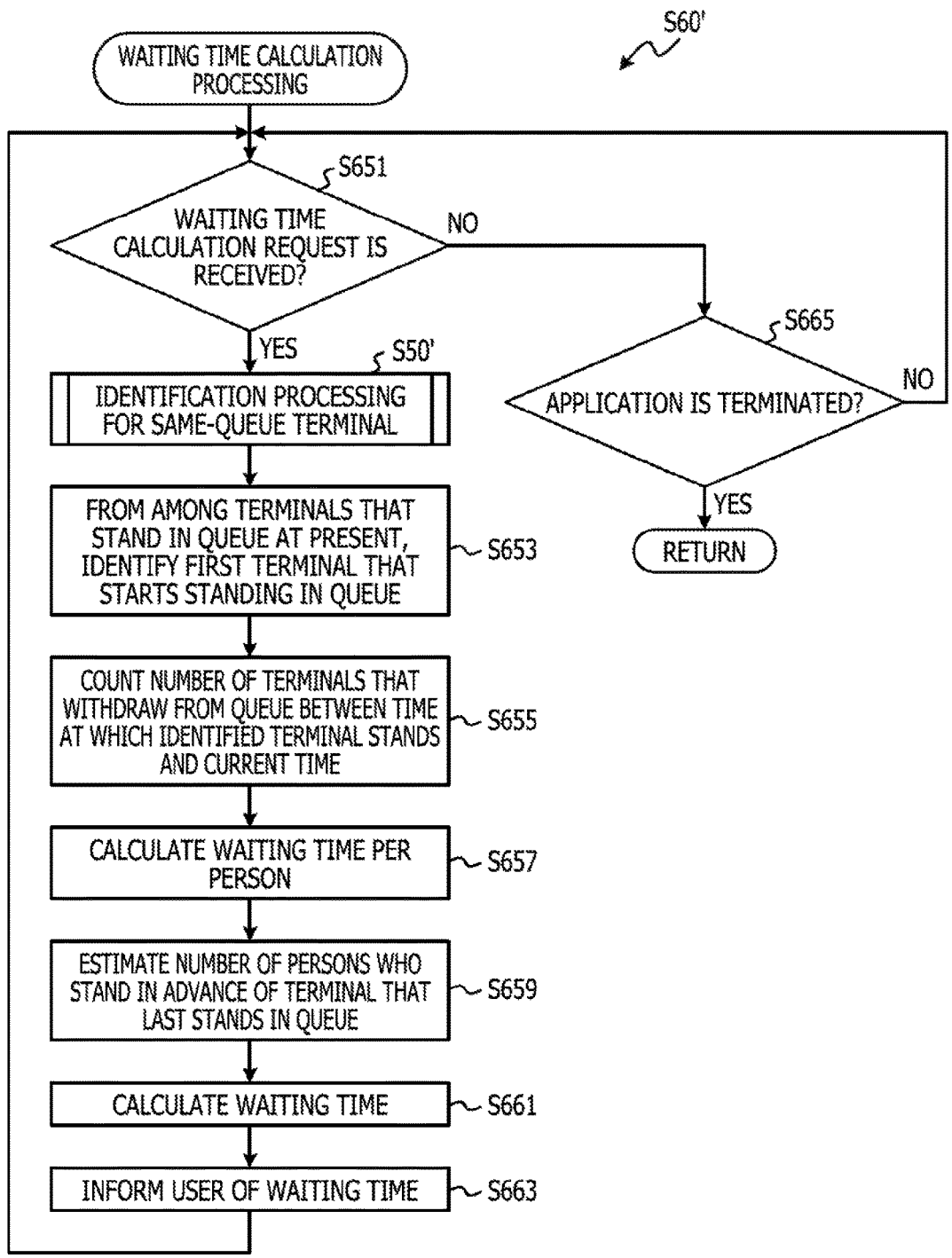
FIG. 22 is a flowchart illustrating details of waiting time calculation processing.

In processing in FIG. 22, in step S651, the identification unit 23 determines whether or not a waiting time calculation request that requests to calculate a waiting time is received from the user via the user interface 305. In a case where the determination here is affirmed, the identification unit 23 performs the identification processing for a same-queue terminal (S50').

Here, details of the identification processing for a same-queue terminal (S50') will be described with reference to FIG. 23.

In processing in FIG. 23, first in step S551, from among the mobile terminal 10 registered in the operation pattern DB 27, the identification unit 23 selects one of the mobile terminals 10, for which no processing completion flag and no queue number are registered.

In subsequent step S553, it is determined whether or not sufficient movement information to identify the mobile terminals 10 included in the same queue as that of the mobile terminal 10 selected in step S551 is accumulated in the operation pattern DB 27. Here, in a case where the number of cycles of, for example, a movement→ a stop registered in the field of "MOVEMENT INFORMATION" of the mobile terminal 10 selected in step S551 is greater than or equal to a predetermined number (for example, greater than or equal to 2 cycles), the identification unit 23 determines that the sufficient movement information to identify is accumulated.

In a case where the determination in step S553 is affirmed, the identification unit 23 makes a transition to step S559 and identifies the mobile terminals 10 included in the same queue as that of the mobile terminal 10 selected in step S551, by using the same method as that in step S507 in FIG. 10. Note that at this time, the identification unit 23 may identify the mobile terminals 10 included in the same queue, by using most recent operation patterns (for example, most recent 2 or 3 cycles out of cycles of a movement→a stop) of each of the mobile terminal 10 selected in step S551 and the other mobile terminals 10. From this, it is possible to consider the mobile terminals 10 of persons who do not stand in the queue at first and who stand in the queue later, or the like.

In subsequent step S561, the identification unit 23 registers a queue number in the field of "QUEUE NUMBER" of each of the mobile terminals 10 identified, in step S559, as being included in the same queue. In a case where the identification unit 23 identifies, for example, the mobile terminals 10-B to 10-D as the mobile terminals 10 included in the same queue as that of the mobile terminal 10-A, "1" is registered in the field of "QUEUE NUMBER" of each of the mobile terminals 10-A to 10-D, as illustrated in FIG. 24A. Note that in a case where, in step S559, it is difficult to identify the mobile terminals 10 included in the same queue, the identification unit 23 registers a queue number in the field of "QUEUE NUMBER" of the mobile terminal 10 selected in step S551. In a case where it is difficult to identify the mobile terminals 10 included in the same queue as that of, for example, the mobile terminal 10-E, the identification unit 23 registers "2" in the field of "QUEUE NUMBER" of the mobile terminal 10-E, as illustrated in FIG. 24A. If the processing operation in step S561 finishes, the processing makes a transition to step S557.

By the way, in a case where the determination in step S553 is denied, the identification unit 23 makes a transition to step S555 and sets, in the field of "PROCESSING COMPLETION FLAG" of the selected mobile terminal 10, "X" indicating processing completion. It is assumed that the identification unit 23 determines that sufficient movement information to identify the mobile terminals 10 included in the same queue is not accumulated in the operation pattern DB 27 of, for example, the mobile terminal 10-F. In this case, as illustrated in FIG. 24B, the identification unit 23 sets "X" in the field of "PROCESSING COMPLETION FLAG".

In subsequent step S557, the identification unit 23 determines whether or not processing for identifying the mobile terminals 10 included in the same queue is performed on all the mobile terminals 10 registered in the operation pattern DB 27. Specifically, the identification unit 23 determines whether or not a processing completion flag or a queue number is registered in the operation pattern DB 27 for each of all the mobile terminals 10. In a case where the determination here is denied, the processing returns to step S551, and in a case where the determination here is affirmed, the processing makes a transition to step S563.

Upon making a transition to step S563, the identification unit 23 determines, as a queue, a line including the largest number of the mobile terminals 10. In a case of FIG. 24B, the line including the largest number of the mobile terminals 10 is a queue having "QUEUE NUMBER" of "1". Accordingly, the identification unit 23 determines, as a queue, the line having "QUEUE NUMBER" of "1". If step S563 finishes, the processing returns to step S653 in FIG. 22.

Returning to FIG. 22, in step S653, from among the mobile terminals 10 that stand in the queue identified in the identification processing for a same-queue terminal in FIG. 23, the calculation unit 25 identifies the mobile terminal 10 of a first person who starts standing in the queue. Specifically, from among the mobile terminals 10 for each of which a value is registered in the field of "QUEUE NUMBER" in the operation pattern DB 27 and for each of which "WITHDRAWAL TIME" is not stored, the calculation unit 25 identifies one of the mobile terminals 10, for which a time stored in the field of "START TIME" is the earliest. In a case where the operation pattern DB 27 illustrated in, for example, FIG. 25A is registered, the calculation unit 25 identifies one of the mobile terminals 10, the terminal ID of which is "10-D".

In subsequent step S655, the calculation unit 25 counts the number of the mobile terminals 10 that withdraw from the queue between a time at which a user of the mobile terminal 10 identified in step S653 starts standing in the queue and a current time. Specifically, the calculation unit 25 counts the number of the mobile terminals 10 for each of which a time earlier than "START TIME" of the mobile terminal 10 identified in S653 is registered in the field of "START TIME" and for each of which a time later than "START TIME" of the mobile terminal 10 identified in S653 is registered in the field of "WITHDRAWAL TIME". In a case where the operation pattern DB 27 illustrated in, for example, FIG. 25 is registered, the calculation unit 25 defines 3 mobile terminals of the mobile terminals 10-A to 10-C as the number of the mobile terminals 10 that withdraw from the queue.

In subsequent step S657, the calculation unit 25 calculates a waiting time per person. Specifically, first the calculation unit 25 calculates a time obtained by subtracting, from a current time, "START TIME" of the mobile terminal 10 of the first person who starts standing in the queue. Next, by dividing the relevant time by the number of the mobile terminals 10 that withdraw from the queue, the number of the mobile terminals 10 being acquired in step S655, the waiting time per person is calculated.

In subsequent step S659, the calculation unit 25 estimates the number of persons who stand in advance of the mobile terminal 10 (the rearmost mobile terminal 10) of a person who last stands in the queue. Specifically, the calculation unit 25 obtains an average value (defined as a third average value) of times between movements of the mobile terminal 10 immediately in front of the rearmost mobile terminal 10 and times at which the rearmost mobile terminal 10 starts movements. In addition, regarding each of pairs of the mobile terminals 10 that are adjacent to each other in an alignment order, the calculation unit 25 calculates a time between a movement of one of the two mobile terminals 10 and a time at which the other of the two mobile terminals 10 starts a movement, and the calculation unit 25 obtains an average value (defined as a fourth average value) of the relevant calculated times. In addition, in a case where the third average value is larger than the fourth average value, the calculation unit 25 obtains an integer portion of a value calculated by dividing the third average value by the fourth average value and defines the integer portion as the number of persons who have none of the mobile terminals 10 and who stand in advance of a user of the rearmost mobile terminal 10. The calculation unit 25 may round the value calculated by dividing the third average value by the fourth average value and may define a value obtained based on the rounding, as the number of persons who have none of the mobile terminals 10 and who stand in advance of the user of the rearmost mobile terminal 10.

The calculation unit 25 adds the number of persons who have none of the mobile terminals 10, to the number of the mobile terminals 10 that stand in advance of the user of the rearmost mobile terminal 10, thereby calculating the number of persons who stand in advance of the rearmost mobile terminal 10.

In subsequent step S661, the calculation unit 25 multiplies the waiting time per person, calculated in step S657, by the number of persons who stand in advance of the user of the rearmost mobile terminal 10, estimated in step S659, thereby calculating a time (a waiting time) it takes for the rearmost mobile terminal 10 to reach a head of the queue.

In subsequent step S663, the calculation unit 25 informs the administrator of the waiting time calculated in step S661. The calculation unit 25 displays the waiting time in, for example, the user interface 305. The calculation unit 25 may inform of the waiting time by using sound from a speaker not illustrated. After the processing operation in step S663 finishes, the processing returns to step S651. From this, it is possible for the administrator (for example, a staff who arranges the queue) to know the waiting time of the queue and to inform a person, who intends to stand in the queue, of the waiting time.

By the way, in a case where the determination in step S651 is denied, the calculation unit 25 makes a transition to step S665 and determines whether or not the application is terminated. In a case where the determination here is denied, the processing returns to step S651. However, in a case where the determination here is affirmed, the processing makes a transition to step S111 in FIG. 19.

Upon making a transition to step S111 in FIG. 19, the acquisition unit 21 initializes the operation pattern DB 27 and terminates the processing in FIG. 19.

As precisely described above, according to the second embodiment, the information processing system 500B includes the mobile terminals 10 and the processing device 20B able to directly communicate with the mobile terminals 10, and the processing device 20B is mounted in the electronic device 30 different from the mobile terminals 10. In addition, the processing device 20B includes the acquisition unit 21, the identification unit 23, and the calculation unit 25, the acquisition unit 21 being configured to acquire, from each of the mobile terminals 10, information related to a movement and a stop of the relevant mobile terminal 10, the identification unit 23 being configured to identify a queue including at least 1 of the mobile terminals 10, based on whether or not operation patterns of the respective mobile terminals 10, acquirable from information related to movements and stops of the mobile terminals 10, are similar, the calculation unit 25 being configured to calculate, from information related to movements and stops of the mobile terminals 10 included in the queue, a period of time that elapses before the mobile terminal 10 that stands at an end of the queue reaches a head of the queue. From this, it is possible to identify (detect) a queue that exists around the electronic device 30 and to notify the user of the electronic device 30 of a waiting time of the relevant queue.

(Example of Modification)

In the above-mentioned second embodiment, some of processing operations performed by the electronic device 30 may be performed by an information processing device such as a server computer, provided separately from the electronic device 30. In this case, the electronic device 30 communicates with the mobile terminals 10 and transmits, to the server computer, information obtained based on the relevant communication. Based on the received information, the server computer performs the processing operations in steps S30', S60', and S70' in FIG. 19. In addition, upon receiving, from the user of the electronic device 30, a request to calculate a waiting time, the electronic device 30 transmits, to the server computer, a waiting time calculation request. The server computer that receives the waiting time calculation request performs the processing operation in, for example, step S60' in FIG. 19 and transmits the calculated waiting time to the electronic device 30. The electronic device 30 displays the received waiting time in the user interface 305 of the electronic device 30, thereby enabling the user of the electronic device 30 to know the waiting time of the queue.

Note that the processing device 20B of the above-mentioned second embodiment may be mounted in each of the mobile terminals 10 of the first embodiment. In this case, before standing in a queue, users of the mobile terminals 10 are able to know a waiting time of the queue. Therefore, it is possible to use the relevant waiting time as information for deciding whether or not to stand in the queue.

Note that in a case of detecting, in the above-mentioned first or second embodiment, movements of the mobile terminals 10 by using acceleration sensors or the like, a motion which has nothing to do with a movement of a queue is erroneously detected as a "movement" in some cases. In this case, if a "motion that repeats a movement and a stop" is already detected and the frequency of erroneous detection is sufficiently small compare therewith, it is possible to exclude the erroneous detection, based on a difference from movements found in operation patterns. If, in, for example, FIG. 26, the operation pattern of the mobile terminal 10-X and the operation pattern of the mobile terminal 10-A are compared, there is a regularity that the mobile terminal 10-A moves t1 seconds before the mobile terminal 10-X moves. Accordingly, the identification unit 23 in the mobile terminal 10-X or electronic device 30 that acquires movement information from the mobile terminal 10-A is able to determine that a movement at t1 seconds before the mobile terminal 10-X moves is a movement associated with a movement of the queue. In this case, the identification unit 23 may determine that movements that occur at other times are caused by the erroneous detection and may remove (delete from the operation pattern DB 27) the movements.

Note that the above-mentioned processing functions may be realized by a computer. In that case, a program in which processing contents of functions to be included in the processing device are described is provided. The computer executes the program, thereby realizing the above-mentioned processing functions on the computer. The program in which the processing contents are described may be recorded in a computer-readable recording medium (in this regard, however, carrier waves are excluded).

In a case of distributing the program, the program is marketed in the form of a portable recording medium such as, for example, a Digital Versatile Disc (DVD) or a Compact Disc Read Only Memory (CD-ROM) in which the program is recorded. In addition, the program may be stored in a storage device of a server computer and may be transferred by the server computer to other computers via a network.

A computer to execute the program stores, in, for example, a storage device in the computer itself, the program recorded in the portable recording medium or the program transferred by the server computer. In addition, the computer reads the program from the storage device in the computer itself and performs processing operations conformable to the program. Note that the computer may also directly read the program from the portable recording medium and may perform processing operations conformable to the program. In addition, every time a program is transferred by the server computer, the computer may also sequentially perform processing operations conformable to the received program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device configured to communicate with a plurality of mobile terminals, the plurality of mobile terminals including a sensor device to sense movements of the plurality of mobile terminals respectively, the information processing device comprising:
   a memory;
   a wireless communication device configured to:
      receive, from the plurality of mobile terminals, information indicating the movements of the plurality of mobile terminals sensed by the sensor device respectively; and
   a processor coupled to the wireless communication device and configured to:
   identify, based on the information received by the wireless communication device, movement patterns of the plurality of mobile terminals,
      identify, based on the movement patterns, a queue including at least two mobile terminals of the plurality of mobile terminals, and
      identify, based on the information of the mobile terminals included in the queue, a waiting time that is an expected time duration for a first mobile terminal to reach a head of the queue from the present time, the first mobile terminal being one of the plurality of mobile terminals and being included in the queue, and
   the wireless communication device configured to:
      transmit, to the first mobile terminal, a signal indicating the identified waiting time.

2. The information processing device according to claim 1, wherein
   the information includes a stop time at which one of the plurality of mobile terminals stops and a movement start time at which the one of the plurality of mobile terminals starts a movement.

3. The information processing device according to claim 2, wherein the processor is further configured to identify, based on a mutual relationship between the movement start times of the at least two mobile terminals included in the queue, an order of the at least two mobile terminals in the queue.

4. The information processing device according to claim 3, wherein the processor is further configured to:
   identify a first time difference between the movement start time of the first mobile terminal and the movement start time of a third mobile terminal immediately in front of the first mobile terminal in the order in the queue,
   identify a second time difference between the movement start time of a fourth mobile terminal included in the queue and the movement start time of a fifth mobile terminal that is included in the queue and that is next to the third mobile terminal in the order, and
   identify, based on a ratio between the first time difference and the second time difference, a number of persons who is in advance of a user having the first mobile terminal and who does not have a mobile terminal.

5. The information processing device according to claim 2, wherein
   each of the plurality of mobile terminals includes an acceleration sensor,
   each of the acceleration sensor detects movement of the mobile terminal respectively, and
   the processor records the movement start times and the stop times of the plurality of mobile terminals.

6. The information processing device according to claim 1, wherein the processor is configured to identify the queue in a case where the movement patterns of the at least two mobile terminals are similar to each other.

7. The information processing device according to claim 1, wherein
   the processor is configured to identify the waiting time, based on a first time period between a first time at which a second mobile terminal that is a mobile terminal included in the plurality of mobile terminals and that is located at the head of the queue joined the queue and a second time at which the second mobile terminal reaches the head of the queue, a number of the plurality of mobile terminals that leave the queue in the first time period, and a number of the plurality of mobile terminals included in the queue.

8. The information processing device according to claim 1, wherein
   the information processing device is included in the first mobile terminal.

9. The information processing device according to claim 1, wherein
   the information processing device is included in an electronic device different from the plurality of mobile terminals, and
   the information processing device notifies the first mobile terminal of the waiting time.

10. A method executed by an information processing device including a wireless communication device and a processor coupled to the wireless communication device, the information processing device being configured to communicate with a plurality of mobile terminals including a sensor device to sense movements of the plurality of mobile terminals respectively, the method comprising:
    receiving, by the wireless communication device, from the plurality of mobile terminals, information related to movements of the plurality of mobile terminals sensed by the sensor device respectively;
    identifying, by the processor, based on the information received by the wireless communication device, movement patterns of the plurality of mobile terminals;
    identifying, by the processor, based on the movement patterns, a queue including at least two mobile terminals of the plurality of mobile terminals;
    identifying, by the processor, based on the information of the mobile terminals included in the queue, the waiting time that elapses before a first mobile terminal that is one of the plurality of mobile terminals and that is included in the queue reaches a head of the queue; and
    transmitting, by the wireless communication device, to the first mobile terminal, a signal indicating the identified waiting time.

11. The computer-implemented method according to claim 10, wherein
    the information includes a stop time at which one of the mobile terminals stops and a movement start time at which the one of the mobile terminals starts a movement.

12. The computer-implemented method according to claim 11 further comprising:
    identifying, based on a mutual relationship between the movement start times of the at least two mobile terminals included in the queue, an order of the at least two mobile terminals in the queue.

13. The computer-implemented method according to claim 10, wherein the identifying of the queue further comprises:

detecting whether the movement patterns of the at least two mobile terminals are similar to each other.

14. The computer-implemented method according to claim 10, wherein
in the identifying of the waiting time, the waiting time is identified based on a first time period between a first time at which a second mobile terminal that is a mobile terminal included in the plurality of mobile terminals and that is located at the head of the queue joined the queue and a second time at which the second mobile terminal reaches the head of the queue, a number of the mobile terminals that leave the queue in the first time period, and a number of the mobile terminals included in the queue.

15. A non-transitory computer-readable storage medium storing a program that causes an information processing apparatus to execute a process, the information processing device including a wireless communication device, the information processing device being configured to communicate with a plurality of mobile terminals including a sensor device to sense movements of the plurality of mobile terminals respectively, the process comprising:
controlling the wireless communication device to receive, from the plurality of mobile terminals, information indicating movements of the plurality of mobile terminals;
identifying, based on the information received by the wireless communication device, movement patterns of the plurality of mobile terminals;
identifying, based on the movement patterns, a queue including at least two mobile terminals of the plurality of mobile terminals;
identifying, based on the information of the mobile terminals included in the queue, the waiting time that elapses before a first mobile terminal that is one of the plurality of mobile terminals and that is included in the queue reaches a head of the queue; and
controlling the wireless communication device to transmit, to the first mobile terminal, a signal indicating the identified waiting time.

16. The non-transitory computer-readable storage medium according to claim 15, wherein
the information includes a stop time at which one of the mobile terminals stops and a movement start time at which the one of the mobile terminals starts a movement.

17. The non-transitory computer-readable storage medium according to claim 15, wherein the identifying of the queue further comprises:
detecting whether the movement patterns of the at least two mobile terminals are similar to each other.

18. The non-transitory computer-readable storage medium according to claim 15, wherein
in the identifying of the waiting time, the waiting time is identified based on a first time period between a first time at which a second mobile terminal that is a mobile terminal included in the plurality of mobile terminals and that is located at the head of the queue joined the queue and a second time at which the second mobile terminal reaches the head of the queue, a number of the mobile terminals that leave the queue in the first time period, and a number of the mobile terminals included in the queue.

* * * * *